United States Patent
Chu et al.

(10) Patent No.: US 11,694,433 B2
(45) Date of Patent: Jul. 4, 2023

(54) DETECTION OF PROJECTED INFRARED PATTERNS USING DIFFERENCE OF GAUSSIAN AND BLOB IDENTIFICATION

(71) Applicant: Google LLC, Mountain View, CA (US)

(72) Inventors: Wen-Sheng Chu, Santa Clara, CA (US); Kuntal Sengupta, San Jose, CA (US)

(73) Assignee: Google LLC, Mountain View, CA (US)

( * ) Notice: Subject to any disclaimer, the term of this patent is extended or adjusted under 35 U.S.C. 154(b) by 194 days.

(21) Appl. No.: 17/421,505

(22) PCT Filed: Feb. 15, 2019

(86) PCT No.: PCT/US2019/018173
§ 371 (c)(1),
(2) Date: Jul. 8, 2021

(87) PCT Pub. No.: WO2020/167314
PCT Pub. Date: Aug. 20, 2020

(65) Prior Publication Data
US 2022/0083775 A1    Mar. 17, 2022

(51) Int. Cl.
*G06K 9/00* (2022.01)
*G06V 20/10* (2022.01)
(Continued)

(52) U.S. Cl.
CPC .............. *G06V 20/10* (2022.01); *G06F 18/22* (2023.01); *G06T 7/521* (2017.01); *G06T 7/73* (2017.01);
(Continued)

(58) Field of Classification Search
CPC ...... G06V 20/10; G06V 10/141; G06V 10/02; G06V 10/95; G06F 18/22; G06T 7/521;
(Continued)

(56) References Cited

U.S. PATENT DOCUMENTS 8,103,055 B2    1/2012  Stoddart et al.
10,401,158 B2 * 9/2019  Gernoth ............... G06V 10/145
(Continued)

FOREIGN PATENT DOCUMENTS

DE        202018000408        5/2018

OTHER PUBLICATIONS

Alhwarin et al., "IR Stereo Kinect: Improving Depth Images by Combining Structured Light with IR Stereo," International Conference on Computer Analysis of Images and Patterns, Lecture Notes in Computer Science, Dec. 31, 2014, pp. 409-421.
(Continued)

*Primary Examiner* — Tom Y Lu
(74) *Attorney, Agent, or Firm* — McDonnell Boehnen Hulbert & Berghoff LLP

(57) ABSTRACT

A method may include obtaining an infrared image of an object and determining a difference of Gaussian image that represents features of the infrared image that have spatial frequencies within a spatial frequency range defined by a first Gaussian operator and a second Gaussian operator. The method may also include identifying one or more blob regions within the difference of Gaussian image. Each blob region of the one or more blob regions includes a region of connected pixels in the difference of Gaussian image. The method may further include, based on identifying the one or more blob regions within the difference of Gaussian image, determining that the infrared image represents the object illuminated by a pattern projected onto the object by an infrared projector.

19 Claims, 10 Drawing Sheets

(51) Int. Cl.
  G06T 7/521    (2017.01)
  G06T 7/73     (2017.01)
  G06V 10/141   (2022.01)
  G06V 10/94    (2022.01)
  G06V 10/22    (2022.01)
  G06F 18/22    (2023.01)
  H04N 23/56    (2023.01)

(52) U.S. Cl.
  CPC ............ *G06V 10/141* (2022.01); *G06V 10/22* (2022.01); *G06V 10/95* (2022.01); *H04N 23/56* (2023.01); *G06T 2207/10048* (2013.01); *G06T 2207/20084* (2013.01)

(58) Field of Classification Search
  CPC ............ G06T 7/73; G06T 2207/10048; G06T 2207/20084; H04N 23/56
  See application file for complete search history.

(56) References Cited

U.S. PATENT DOCUMENTS

| | | | | |
|---|---|---|---|---|
| 10,430,642 | B2* | 10/2019 | Bouaziz | G06T 17/20 |
| 10,713,475 | B2* | 7/2020 | Gernoth | G06V 40/166 |
| 11,394,902 | B2* | 7/2022 | Wang | H04N 25/705 |
| 2014/0240492 | A1 | 8/2014 | Lee | |
| 2019/0041197 | A1 | 2/2019 | Gernoth et al. | |

OTHER PUBLICATIONS

Davidson et al., "Molecular Expressions Microscopy Primer: Digital Image Processing—Interactive Tutorials—Difference of Gaussians Edge Enhancement Algorithm," Olympus America Inc. and Florida State University, https://micro.magnet.fsu.edu/primer/java/digitalimaging/processing/diffgaussians/index.html, 2016, 3 pages.

Enroth-Cugell et al., "The Contrast Sensitivity of Retinal Ganglion Cells of the Cat," J. Physiol., 1966, pp. 517-552, vol. 187.

Ferraz et al., "A scale invariant interest point detector for discriminative blob detection,", Conference: Pattern Recognition and Image Analysis, 4th Iberian Conference, IbPRIA 2009, Póvoa de Varzim, Portugal, Jun. 10-12, 2009, pp. 233-240.

International Searching Authority, International Search Report and Written Opinion dated Oct. 21, 2019, issued in connection with International Patent Application No. PCT/US2019/018173, filed on Feb. 15, 2019, 15 pages.

Lindeberg, Tony, "Image Matching Using Generalized Scale-Space Interest Points," J. Math Imaging Vis., 2015, pp. 3-36, vol. 52.

Marr et al., "Theory of edge detection," Proceedings of the Royal Society of London, Series B, Biological Sciences, Feb. 29, 1980, pp. 187-217, vol. 207, No. 1167.

McMahon et al., "The Classical Receptive Field Surround of Primate Parasol Ganglion Cells Is Mediated Primarily by a Non-GABAergic Pathway," The Journal of Neuroscience, Apr. 14, 2004, pp. 3736-3745, vol. 24, No. 15.

Pagare et al., "A Study on Image Annotation Techniques," International Journal of Computer Applications, Jan. 2012, pp. 42-45, vol. 73, No. 6.

Taghavi, Travis, "Machine Learning for Anomaly Detection in Overlapping Aerial Image Streams," Thesis, Texas A&M University, Aug. 2017, 34 pages.

Young, Richard A., "The Gaussian derivative model for spatial vision: 1. Retinal mechanisms," Spatial Vision, 1987, pp. 273-293, vol. 2, No. 4.

International Searching Authority, International Preliminary Report on Patentability dated Aug. 26, 2021, issued in connection with International Patent Application No. PCT/US2019/018173, filed on Feb. 15, 2019, 8 pages.

* cited by examiner

DETECTION OF PROJECTED INFRARED PATTERNS USING DIFFERENCE OF GAUSSIAN AND BLOB IDENTIFICATION

CROSS-REFERENCE TO RELATED APPLICATIONS

The present application is a National Stage Application under 35 U.S.C. § 371 and claims priority to International Patent Application No. PCT/US2019/018173, filed Feb. 15, 2019, and titled "Detection of Projected Infrared Patterns Using Difference of Gaussian and Blob Identification," which is incorporated herein by reference in its entirety.

BACKGROUND

A three-dimensional shape of an object in an environment may be determined by a computing device based on data from one or more depth sensors. The three-dimensional shape may be represented as a two-dimensional image where each pixel indicates the distance between the depth sensor and a corresponding point on the object or in the environment. The depth sensor can operate to determine this distance according to a number of different techniques, including stereo triangulation, structured light, time-of-flight, coded aperture, or a combination thereof, among other possibilities.

SUMMARY

A depth sensing system may utilize a projection of infrared structured light to determine the three-dimensional shape of a target object. The infrared structured light may include a pattern, such as a dot pattern, with which the target object is illuminated while an infrared image of the object is captured to be used in computing the three-dimensional shape thereof. In order to compute the three-dimensional shape, a computing device may first determine whether a given infrared image represents the projected structured light pattern by attempting to detect therein the pattern.

To that end, an infrared image may first be convolved with two Gaussian operators, each acting as a low-pass filter with a different cut-off frequency. A difference of these convolutions may be computed to determine a difference of Gaussian image that preserves image features in a spatial frequency range defined by the respective cut-off frequencies of the two Gaussian operators. Connected regions of pixels may be detected within the difference of Gaussian image and a subset of these connected regions that have certain geometric properties may be identified as blob regions. The number, position, or other attributes of the blob regions may be used to determine whether the infrared image represents the object illuminated by the infrared structured light pattern and/or the specific type of infrared structured light pattern with which the object is illuminated. The blob regions may also be used to facilitate the calculation of various depth distances associated with different portions, regions, or features of the object.

Accordingly, in a first example embodiment, a method is provided that includes obtaining, by a computing system, an infrared image of an object. The method also includes determining, by the computing system, a difference of Gaussian image that represents features of the infrared image that have spatial frequencies within a spatial frequency range defined by a first Gaussian operator and a second Gaussian operator. The method additionally includes identifying, by the computing system, one or more blob regions within the difference of Gaussian image. Each blob region of the one or more blob regions includes a region of connected pixels in the difference of Gaussian image. The method further includes, based on identifying the one or more blob regions within the difference of Gaussian image, determining, by the computing system, that the infrared image represents the object illuminated by a pattern projected onto the object by an infrared projector.

In a second example embodiment, a system is provided that includes an infrared projector configured to project a pattern, an infrared image sensor, a processor configured to perform operations. The operations include operating the infrared projector to project the pattern onto an object and operating the infrared image sensor to capture an infrared image of the object. The operations also include determining a difference of Gaussian image that represents features of the infrared image that have spatial frequencies within a spatial frequency range defined by a first Gaussian operator and a second Gaussian operator. The operations additionally include identifying one or more blob regions within the difference of Gaussian image. Each blob region of the one or more blob regions includes a region of connected pixels in the difference of Gaussian image. The operations further include, based on identifying the one or more blob regions within the difference of Gaussian image, determining that the infrared image represents the object illuminated by the pattern projected onto the object by the infrared projector.

In a third example embodiment, a non-transitory computer-readable storage medium is provided, having stored thereon instructions that, when executed by a computing device, cause the computing device to perform operations. The operations include obtaining an infrared image of an object. The operations also include determining a difference of Gaussian image that represents features of the infrared image that have spatial frequencies within a spatial frequency range defined by a first Gaussian operator and a second Gaussian operator. The operations additionally include identifying one or more blob regions within the difference of Gaussian image. Each blob region of the one or more blob regions includes a region of connected pixels in the difference of Gaussian image. The operations further include, based on identifying the one or more blob regions within the difference of Gaussian image, determining that the infrared image represents the object illuminated by a pattern projected onto the object by an infrared projector.

In a fourth example embodiment, a system is provided that includes means for obtaining an infrared image of an object. The system also includes means for determining a difference of Gaussian image that represents features of the infrared image that have spatial frequencies within a spatial frequency range defined by a first Gaussian operator and a second Gaussian operator. The system additionally includes means for identifying one or more blob regions within the difference of Gaussian image. Each blob region of the one or more blob regions includes a region of connected pixels in the difference of Gaussian image. The system further includes means for determining, based on identifying the one or more blob regions within the difference of Gaussian image, that the infrared image represents the object illuminated by a pattern projected onto the object by an infrared projector.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
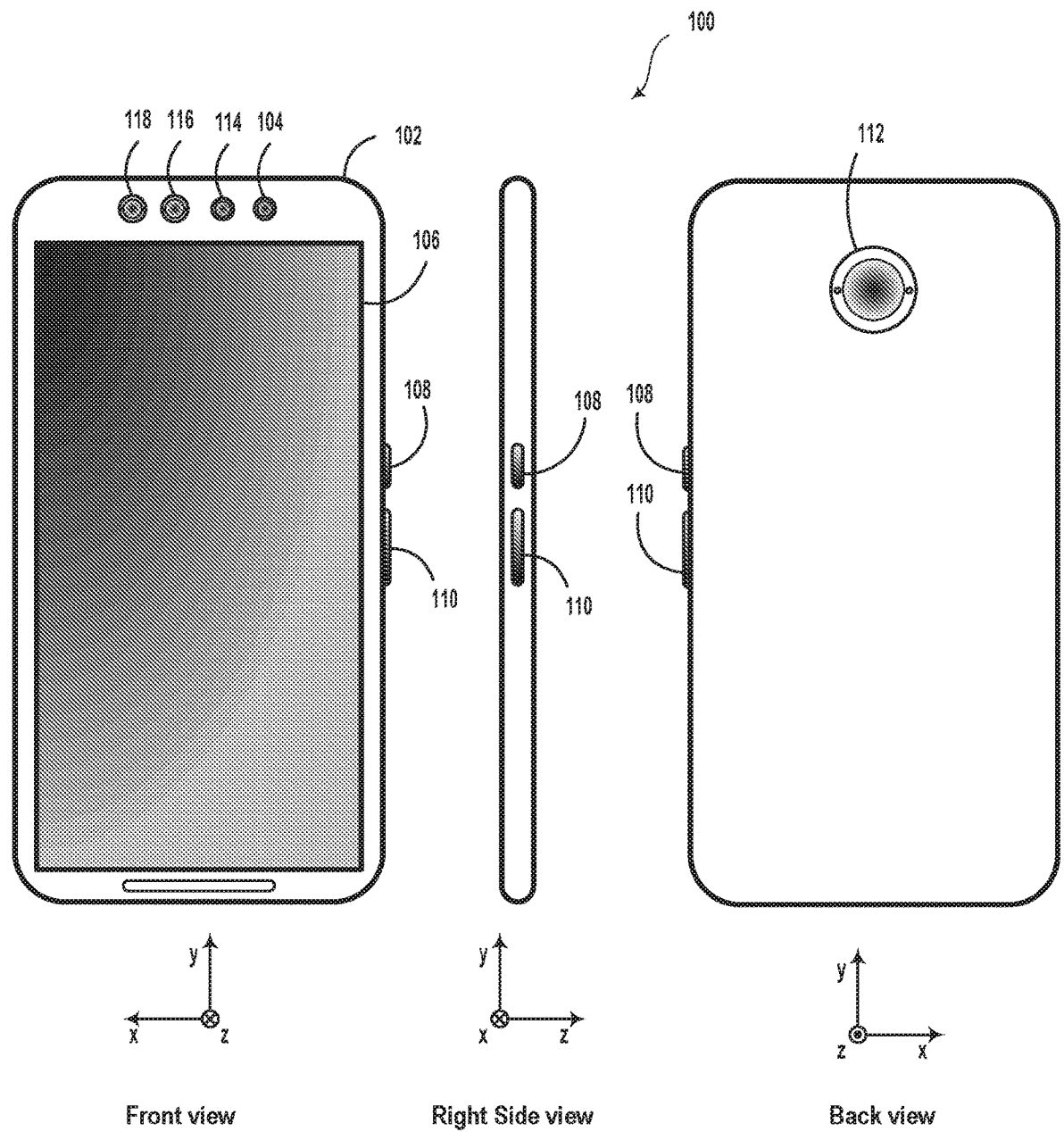
FIG. 1 illustrates an infrared image capture system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A depth sensing system may include an infrared projector configured to project structured light onto an object, scene, or environment to determine the three-dimensional shape thereof. The structured light may define a pattern, such as a dot pattern and/or a flood pattern, with which the object, scene, or environment is illuminated. The depth sensing system may also include an infrared camera configured to capture an infrared image of the object while it is illuminated by the infrared structured light pattern. The captured infrared image may be used in computing the three-dimensional shape of the object.

In some cases, however, when an infrared image is captured, it might not be known whether this infrared image actually represents the object illuminated by the infrared pattern and/or what type of pattern the object is illuminated with. In one example, the infrared projector and the infrared camera might not be correctly synchronized. Thus, some infrared images may represent the pattern projected by the infrared projector, while other might not. Similarly, when the infrared projector projects multiple different patterns, or when two or more different infrared projectors each project a corresponding different pattern, it might not be know which pattern, if any, a given infrared image represents.

In another example, the infrared projector and the infrared camera may be part of a first subsystem of a computing device (e.g., facial recognition system) and may be correctly synchronized with each other. However, the computing device may also include a second subsystem (e.g., iris recognition and tracking system) that includes an additional infrared projector and camera which are not synchronized with the first subsystem. Due to the lack of synchronization between these subsystems, the two subsystems may interfere with one another. That is, for example, the second subsystem may project its corresponding infrared pattern while the first subsystem is attempting to capture an image that does not include a structured light pattern or that includes its own structured light pattern.

Similarly, when multiple different computing devices that include respective depth sensing systems are used in close proximity to one another, these devices may interfere with one another. Namely, while a first device is capturing an infrared image of a structured light pattern projected by the infrared projector thereof onto an object, a second computing device may project a portion of its own structured light pattern onto the object. Such a case may arise, for example, when two users of smartphones equipped with respective depth sensing systems use the smartphones in the same room. Notably, regardless of whether the patterns projected by the first and second computing device are the same or different, the presence of additional, unexpected pattern elements in an infrared image may make such an image unsuitable for use in depth sensing. This type of interference may occur even when the infrared projectors and cameras of a computing device are internally synchronized.

Thus, in order to compute the three-dimensional shape of an object (or use the infrared image for other applications), a computing device may first determine whether a given infrared image represents a particular structured light pattern. In one example, the computing device may be configured to differentiate between images that represent the object illuminated by a dot pattern and a flood pattern, although differentiation among other types of patterns is also possible. The dot pattern may include circular dots, while the flood pattern may be uniform. That is, the flood pattern may project an equal amount of light at all points along the object and thus might not include any discernible individual elements.

In order to detect a structured light pattern in an infrared image, the computing device or system may first compute a first convolution of the infrared image with a first Gaussian operator and a second convolution of the infrared image with a second Gaussian operator. The first and second convolutions may generate respective intermediate images. A difference of these intermediate images may be computed to determine a difference of Gaussian image that represents features of the infrared image that have spatial frequencies within a spatial frequency range defined by the first and second Gaussian operators.

Namely, convolution of the infrared image with a Gaussian operator operates as a low-pass filter that preserves image features with spatial frequencies below a corresponding cut-off frequency and removes spatial features with spatial frequencies above the corresponding cut-off frequency. The cut-off frequency may be defined by the standard deviation of a Gaussian distribution on which the Gaussian operator is based. The first and second Gaussian operators may each have a different cut-off frequency. For example, the cut-off frequency of the second Gaussian operator may be higher than the cut-off frequency of the first Gaussian operator.

Thus, the difference of the intermediate images determined through the convolutions with the respective Gaussian operators acts as a band-pass filter that preserves image features having spatial frequencies above the cut-off frequency of the first Gaussian operator and below the cut-off frequency of the second Gaussian operator. By adjusting the respective standard deviations of the Gaussian operators, the system may be configured to accommodate a different range of spatial frequencies, and thus a different range of structured light patterns and distances between the infrared projector and the object at the moment of image acquisition.

The difference of Gaussian image may be further processed in an attempt to identify therein blob regions that may represent the dot pattern. Notably, blob regions may sometimes be referred to simply as blobs. To that end, the computing device may identify connected regions of pixels that each have the same or nearly the same pixel values. For example, in an implementation where the difference of Gaussian image is thresholded to generate a binary image, one example connected region may be defined by a group of white pixels, where each pixel in the group is adjacent (e.g., horizontally, vertically, or diagonally) to at least one other white pixel. Alternatively or additionally, in an implementation where the difference of Gaussian image is a grayscale image, another example connected region may be defined by a group of adjacent pixels with values between 0 and 7 (where, e.g., the value of each pixel could range from 0 to 255). Other definitions of a connected region are possible.

From these connected regions, the computing device may identify connected regions that have particular geometric attributes. In the case of the dot pattern, connected regions that include a number of pixels within a predetermined range and have at least a minimum circularity metric associated therewith (i.e., at least approximate a circular shape) may be identified as blob regions. Other metrics may be utilized when the elements of the projected pattern are of a different shape. In the case of square pattern elements for example, a connected region may be identified as a blob region when it includes a number of pixels within the predetermined pixel range, when the sides of the connected region approximate lines (e.g., as quantified by a least squares calculation), and when the ratio of the long side to the short side of the connected region is within a threshold distance of one.

Based on the number, density, locations, or other attributes of the identified blob regions, the computing device may determine whether the analyzed image represents the object illuminated by a particular infrared light pattern. For example, when the number of blob regions exceeds a threshold value, an infrared image may be determined to represent a dot pattern. On the other hand, when the number of blob regions does not exceed the threshold value, the infrared image may be determined to represent a flood pattern (or no pattern at all).

In some implementations, an image that represents a dot pattern may be paired with an image that represents a flood pattern. That is, the computing device may capture both of these images in close succession, with the flood image being used as a reference for the dot image, for example. In such cases, each image may be processed as described above to identify therein blob regions. Based on the relative number of blob regions in each image, the computing device may determine a likelihood that the two images do, in fact, represent different pattern (i.e., dot and flood). When the likelihood exceeds a threshold confidence value, the image with the greater number of blob regions may be identified as the dot image (i.e., image representing the dot pattern) and the image with fewer number of blob regions may be identified as the flood image (i.e., image representing the flood pattern).

In another example, the operations herein described may be used by a stereoscopic imaging system to determine the spatial correspondence between two stereoscopic images. Namely, a given dot of the projected dot pattern is projected onto a particular physical position on the object but occupies a different area in pixel space of each of the two infrared images of the object. Thus, the difference in position of the dot in pixel space between the two images may be used to determine the disparity between the images and thus triangulate the distance to the corresponding physical point on the object. Identifying the blob regions allows each blob region to serve as an easily-identifiable reference point to be used in triangulation of different surfaces that make up a particular object.

II. Example Computing Systems

FIG. 1 illustrates an example form factor of an infrared image capture system 100. Infrared image capture system 100 may be, for example, a mobile phone, a tablet computer, or a wearable computing device. However, other embodiments are possible. Infrared image capture system 100 may include various elements, such as body 102, display 106, and buttons 108 and 110. Infrared image capture system 100 may further include front-facing camera 104, rear-facing camera 112, front-facing infrared camera 114, first infrared pattern projector 116, and second infrared pattern projector 118.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and infrared image capture system 100 may include multiple cameras positioned on various sides of body 102. Front-facing camera 104 and rear-facing camera 112 may each be configured to capture images in the visible light spectrum.

Display 106 could represent a cathode ray tube (CRT) display, a light emitting diode (LED) display, a liquid crystal (LCD) display, a plasma display, or any other type of display known in the art. In some embodiments, display 106 may display a digital representation of the current image being captured by front-facing camera 104, rear-facing camera 112, and/or infrared camera 114, and/or an image that could be captured or was recently captured by one or more of these cameras. Thus, display 106 may serve as a viewfinder for the cameras. Display 106 may also support touchscreen functions that may be able to adjust the settings and/or configuration of any aspect of infrared image capture system 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 and/or infrared camera 114 may be similarly or differently arranged. Additionally, one or more of front-facing camera 104, rear-facing camera 112, or infrared camera 114, may be an array of one or more cameras.

Either or both of front facing camera 104 and rear-facing camera 112 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

First infrared pattern projector 116 and second infrared pattern projector 118 may each be configured to project a corresponding infrared structured light pattern onto the target object. In one example, first infrared projector 116 may be configured to project a dot pattern and second infrared projector 118 may be configured to project a flood pattern. Thus, first and second infrared projectors 116 and 118 may be used in combination with infrared camera 114 to determine a plurality of depth values corresponding to different physical features of the target object.

Namely, first infrared projector 116 may project a known dot pattern onto the target object, and infrared camera 114 may capture an infrared image of the target object that includes the projected dot pattern. Infrared image capture system 100 may then determine a correspondence between a region in the captured infrared image and a particular part of the projected dot pattern. Given a position of first infrared projector 116, a position of infrared camera 114, and the location of the region corresponding to the particular part of the projected dot pattern within the captured infrared image, infrared image capture system 100 may then use triangulation to estimate a depth to a surface of the target object.

By repeating this for different regions corresponding to different parts of the projected dot pattern, infrared image capture system 100 may estimate the depth of various physical features or portions of the target object. In this way, infrared image capture system 100 may be used to generate a three-dimensional (3D) model of the target object. Second infrared projector 118 may be used to illuminate the target object with a flood pattern to compensate for different lighting conditions (e.g., in dark environments). That is, second infrared projector 118 may allow the images captured by infrared camera 114 to represent the target object illuminated with a substantially constant infrared power across different environments and lighting conditions.

The flood pattern projected by second infrared projector 118 may provide constant and uniform illumination. That is, the flood pattern might not include any distinct features (e.g., it might not be structured). Second infrared projector 118 may instead project infrared light with uniform intensity onto different portions of the object. On the other hand, the dot pattern projected by first infrared projector 116 may include distinct dots. An object illuminated by the dot pattern may appear to be speckled with distinct dots in the infrared spectrum.

In some embodiments, the projected dot pattern may be a known or an otherwise predetermined pattern that is a unique combination or arrangement of dots. When the dot pattern is predetermined, unique portions of that pattern may be located within captured infrared images and may provide a reference point for triangulation. For example, once a unique portion of a predetermined pattern is identified in a captured infrared image, properties of that unique portion of the predetermined pattern (such as its size and location) can be used as a basis to determine the depth of a surface on which that unique portion is projected.

In other embodiments, the projected dot pattern may be randomly generated. In some implementations, multiple infrared light images may be captured of a changing randomly-generated projected dot pattern. Notably, although the pattern may be randomly generated, it may nevertheless be known to a computing device. Thus, the computing device employing structured-light processing may derive depth information for each infrared light image. The depth information corresponding to each different pattern can then be combined to generate a more accurate or complete depth map.

Notably, although a dot pattern is used herein throughout for the purpose of example, the techniques described herein may also be adapted for other types of patterns. For example, in some implementations, the projected pattern may include elements that are rectangular (e.g., stripes, horizontal bars, and/or vertical bars), triangular, oval, grid-like, or irregular in shape, among other possibilities.

Infrared image capture system 100 may also include an ambient light sensor that may continuously or from time to time determine the ambient brightness of a scene (e.g., in terms of visible and/or infrared light) that cameras 104, 112, and/or 114 can capture. In some implementations, the ambient light sensor can be used to adjust the display brightness of display 106. Additionally, the ambient light sensor may be used to determine an exposure length of one or more of cameras 104, 112, or 114, or to help in this determination.

Infrared image capture system 100 could be configured to use display 106 and front-facing camera 104, rear-facing camera 112, and/or front-facing infrared camera 114 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
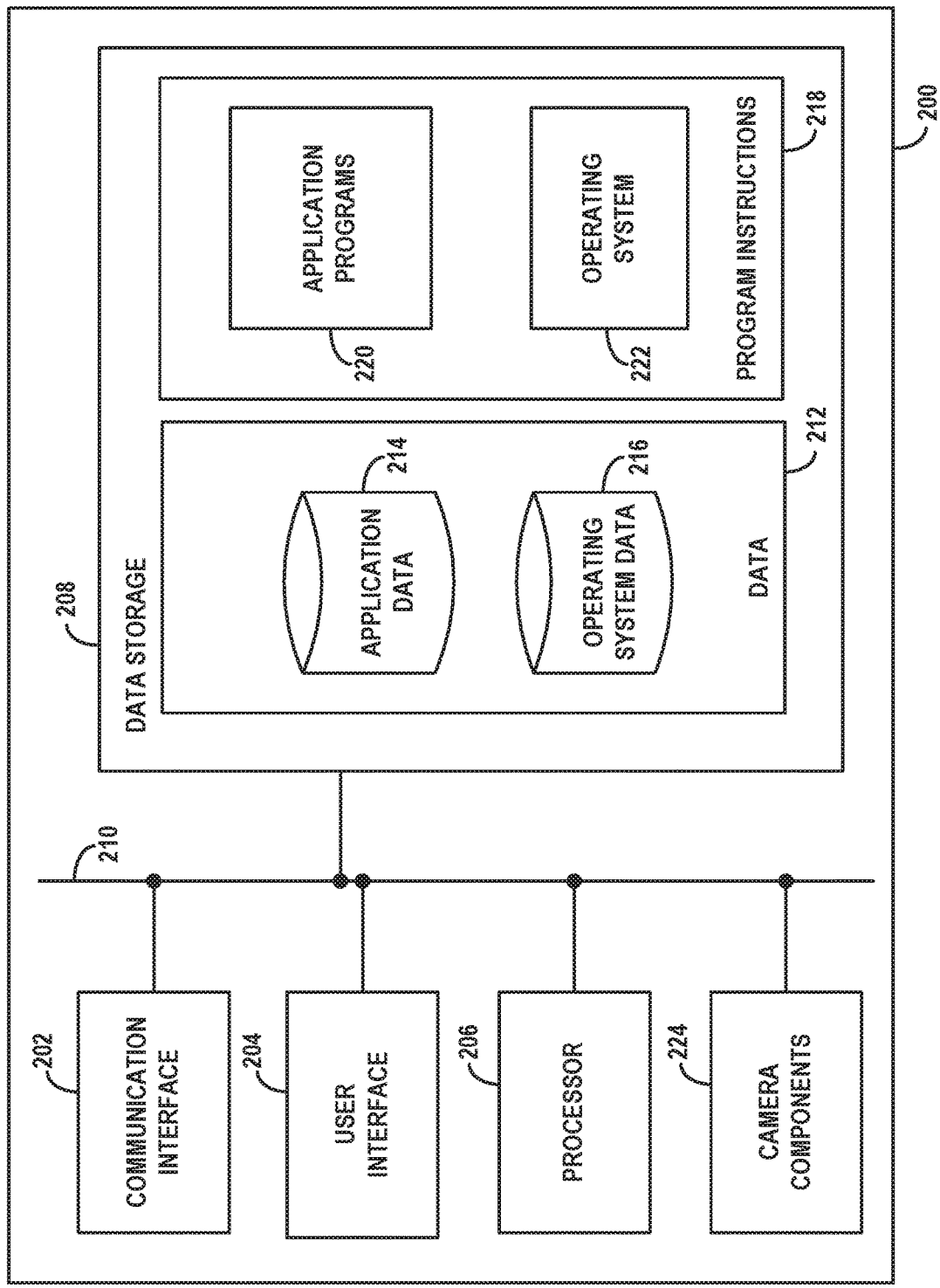
FIG. 2 illustrates a computing system, in accordance with example embodiments.

As noted above, the functions of infrared image capture system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224. Notably, computing device 200 may represent or may form part of a robotic device configured to perform the operations herein disclosed in order to navigate through an environment, manipulate objects, and perform other robotic tasks.

By way of example and without limitation, computing device 200 may be a cellular mobile telephone (e.g., a smartphone a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device equipped with at least some image capture and/or image processing capabilities. It should be understood that computing device 200 may represent a physical depth sensing system, a particular physical hardware platform on which a depth sensing application operates in software, or other combinations of hardware and software that are configured to carry out depth sensing and 3D model generation functions.

As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia interface (HD I) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Dot Pattern Detection Operations

Figure 3A:
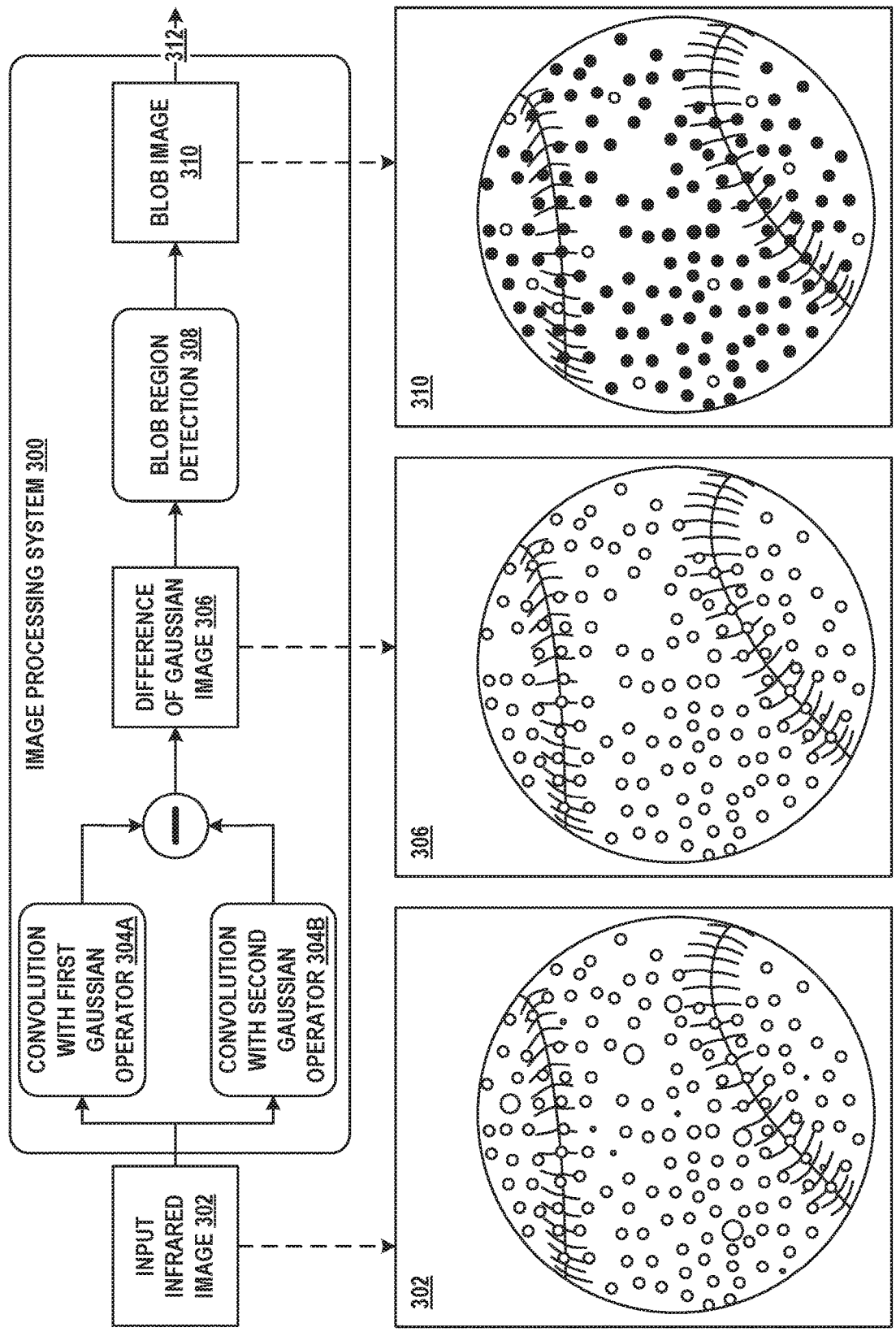
FIG. 3A illustrates an image processing system, in accordance with example embodiments.

FIG. 3A illustrates an example system for identifying blob regions in infrared images. Namely, image processing system 300 may be configured to receive as input infrared image 302 and generate as output at least (i) image 310 (which may be referred to as a blob region image) that represents any detected blob regions and/or (ii) a number of blob regions detected in image 302. Infrared image 302 may represent an object, in this case a baseball, illuminated by an infrared light pattern projected onto the object by an infrared projector. Accordingly, zero or more of any detected blob regions may each represent distinct elements of the projected pattern. Notably, the object may alternatively be any other physical object of interest (e.g., a human face or multiple items distributed across an environment).

For example, when the projected pattern is a dot pattern, a particular blob region may represent a corresponding dot of the dot pattern that has been projected onto the object and detected within the captured infrared image. Thus, image processing system may be used to determine whether infrared image 302 represents the object illuminated by an infrared pattern, determine a type of the infrared pattern represented in infrared image 302, and/or determine the number of elements in the infrared pattern, among other functions.

In order to detect and count blob region in infrared image 302, image processing system 300 may be configured to convolve infrared image 302 with (i) a first Gaussian operator, as indicated by block 304A, and (ii) a second Gaussian operator, as indicated by block 304B. Blocks 304A and 304B, as well as block 308, may represent hardware, software, or a combination thereof configured to execute corresponding operations of image processing system 300.

Convolution of a Gaussian operator with infrared image 302 may operate as a low-pass filter that removes from infrared image 302 features that have a spatial frequency above a particular cut-off frequency (and preserves features below this cut-off frequency). In one example, a Gaussian operator may be a square region of pixels (e.g., a 5 pixel by 5 pixel region) whose pixel values approximate those of a Gaussian distribution with a particular standard deviation. Removal of a feature with a particular spatial frequency may involve attenuation of a signal power associated with that frequency to below a threshold power level.

The first and second Gaussian operators may each have different corresponding standard deviations and thus, when convolved with image 302, operate as low-pass filters with different corresponding cut-off frequencies. Namely, the first Gaussian operator may have a first standard deviation and a corresponding first cut-off frequency. The second Gaussian operator may have a second standard deviation that is different from the first standard deviation, and a corresponding second cut-off frequency that is different from the first cut-off frequency.

In one example, the second cut-off frequency is higher than the first cut-off frequency. Thus, the convolution in block 304B may preserve more high-frequency features of infrared image 302 than the convolution in block 304A. By determining a difference between the outputs (i.e., intermediate images) of blocks 304A and 304B, image processing system 300 may determine difference of Gaussian image 306. Difference of Gaussian image 306 may preserve the features of infrared image 302 that have a spatial frequency above the cut-off frequency of the first Gaussian operator and below the cut-off frequency of the second Gaussian operator. Thus, difference of Gaussian image 306 may represent a band-passed version of infrared image 302.

The range of spatial frequencies preserved by this difference of Gaussian operation and represented in difference of Gaussian image 306 is defined by the cut-off frequencies of the first and second Gaussian operators, which, in turn, depend on the respective standard deviations of these Gaussian operators. Accordingly, in order to detect features of a light pattern projected onto the object and represented in infrared image 302, the standard deviations of the first and second Gaussian operators may be selected to preserve image features within a frequency band that includes the expected spatial frequency of the projected pattern.

Specifically, when the infrared projector is at a first distance from the object, a particular infrared light pattern projected onto the object may have a first spatial frequency. When the infrared projector is moved closer to the object, the spatial frequency of the pattern may increase (and the size of each element of the pattern tray decrease). Conversely, when the infrared projector is moved further away from the object, the spatial frequency of the pattern may decrease (and the size of each element of the pattern may increase). Thus, the standard deviations of the first and second Gaussian operators may be selected such that spatial frequencies of the projected light pattern corresponding to a range between (i) a minimum distance between the infrared projector and the object and (ii) a maximum distance between the infrared projector and the object are preserved. In other words, image processing system 300 may detect blob regions that represent an infrared dot pattern when the projector is within a predetermined range of distances relative to the object.

Accordingly, difference of Gaussian image 306 does not represent a subset of the dots that are contained in infrared image 302. Namely, infrared image 302 includes three different types of dots. A first group of dots, shown in infrared image 302 as having a first size, are, for the purpose of example, assumed to have spatial frequencies within the range defined by the first and second Gaussian operators. A majority of the dots in the first group may represent the projection of the pattern onto the object. The dots of the first group are preserved by the difference of Gaussian operation and are thus represented in difference of Gaussian image 306.

A second group of dots, shown in infrared image 302 as having a second size smaller than the first size are, for the purpose of example, assumed to have spatial frequencies above the range defined by the first and second Gaussian operators. A majority of the dots in the second group may represent features other than the projection of the pattern onto the object physical features of the object). The dots of the second group are not preserved by the difference of Gaussian operation and are thus not represented in difference of Gaussian image 306. Similarly, a third group of dots, shown in infrared image 302 as having a third size larger than the first size are, for the purpose of example, assumed to have spatial frequencies below the range defined by the first and second Gaussian operators. A majority of the dots in the third group may represent features other than the projection of the pattern onto the object. The dots of the third group are not preserved by the difference of Gaussian operation and are thus not represented in difference of Gaussian image 306.

In addition to preserving elements of the projected pattern represented in infrared image 302, difference of Gaussian image 306 may also include other features of infrared image 302 that fall within the frequency range defined by the first and second Gaussian operators (but are not elements of the projected pattern). Thus, difference of Gaussian image 306 represents the outline of the baseball and the stitches thereon which, for the purpose of example, are assumed to have respective spatial frequencies within the range defined by the first and second Gaussian operators. However, in cases where the respective spatial frequencies of the baseball stitches fall outside of the range defined by the first and second Gaussian operators, difference of Gaussian image 306 might not represent these features.

Image processing system 300 may execute one or more algorithms or operations to detect blob regions within difference of Gaussian image 306, as indicated by block 308. Detection of blob regions may involve thresholding difference of Gaussian image 306, which may be a grayscale image. That is, all pixels in difference of Gaussian image 306 having a value above a threshold level (e.g., 127, where each pixel value can range from 0 to 255) are set to each have a maximum value (e.g., 255) to represent the color white, and all pixels having a value below the threshold level are set to each have a minimum value (e.g., 0) to represent the color black. In other words, a binary image may be determined based on difference of Gaussian image 306.

Additionally, detection of blob regions may involve executing a connected component extraction algorithm to identify regions of connected pixels. For example, connected component extraction may identify, in the thresholded image (e.g., the binary image), pixels of the same color that are horizontally, vertically, and/or diagonally adjacent to one another and thus make up a connected region. Alternatively, when thresholding is not used, connected component extraction may identify pixels having values within one or more value ranges that are horizontally, vertically, and/or diagonally adjacent to one another and thus make up a connected region. For example, in the case of a grayscale image, one example pixel value range may be 0 to 7 and any neighboring pixels having values within this range may be considered connected. Other approaches to identifying connected components are possible.

The shape of each connected region may then be evaluated to determine whether it approximates a shape of elements of the projected pattern. In the case of a dot pattern having circular dots, blob region detection 308 may involve determining, for each respective connected region, whether (i) the number of pixels in the respective connected region is within a predetermined range (e.g., 20 to 40 pixels) and (ii) whether the circularity of the respective connected region is above a threshold circularity value. The circularity of a connected region may be defined as $4\pi A/p^2$, where A represents the area of the connected region (e.g., in number of pixels) and p represents the perimeter of the connected region (e.g., in number of pixels). The predetermined range of the number of pixels may be based on the density of the projected dot pattern, the resolution of the infrared camera, and the expected range of distances between the projector and the object at the time of image acquisition, among other factors.

When the shape of a connected region matches the shape of an element of the dot pattern, the connected region may be labeled as a blob region, as indicated with black dots in image 310. On the other hand, when the shape of a connected region does not match the shape of an element of the dot pattern, the connected region might not be labeled as a blob region, as indicated with white dots in image 310.

Blob region detection 308 may generate as output 312 a count of a number of blob regions identified in difference of Gaussian image 306 (and thus also in infrared image 302). Blob region detection 308 may also generate image 310 as output to visually illustrate the blob regions identified in difference of Gaussian image 306. Image 310 may thus represent the positions of the various identified blob regions. Image 310, the count of the number of blob regions therein, and the positions of these blob regions may be used for a plurality of different applications, including, for example, determination of the depth of various features of the object shown in image 302.

In one example, image processing system 300 may be used to determine whether a given infrared image represents an object illuminated by an infrared pattern projected by a projector. Notably, it might not be know what type of projected pattern (e.g., dot or flood) a particular infrared image represents, or even whether the particular infrared image represents a projection of an infrared pattern at all. Thus, for example, when the number of detected blob regions exceeds a threshold value, the infrared image may be determined to represent the object illuminated by a dot pattern. On the other hand, when the number of detected blob regions does not exceed the threshold value, the infrared image may be determined to represent the object illuminated by a flood pattern or not illuminated by an infrared pattern at all.

Figure 3B:
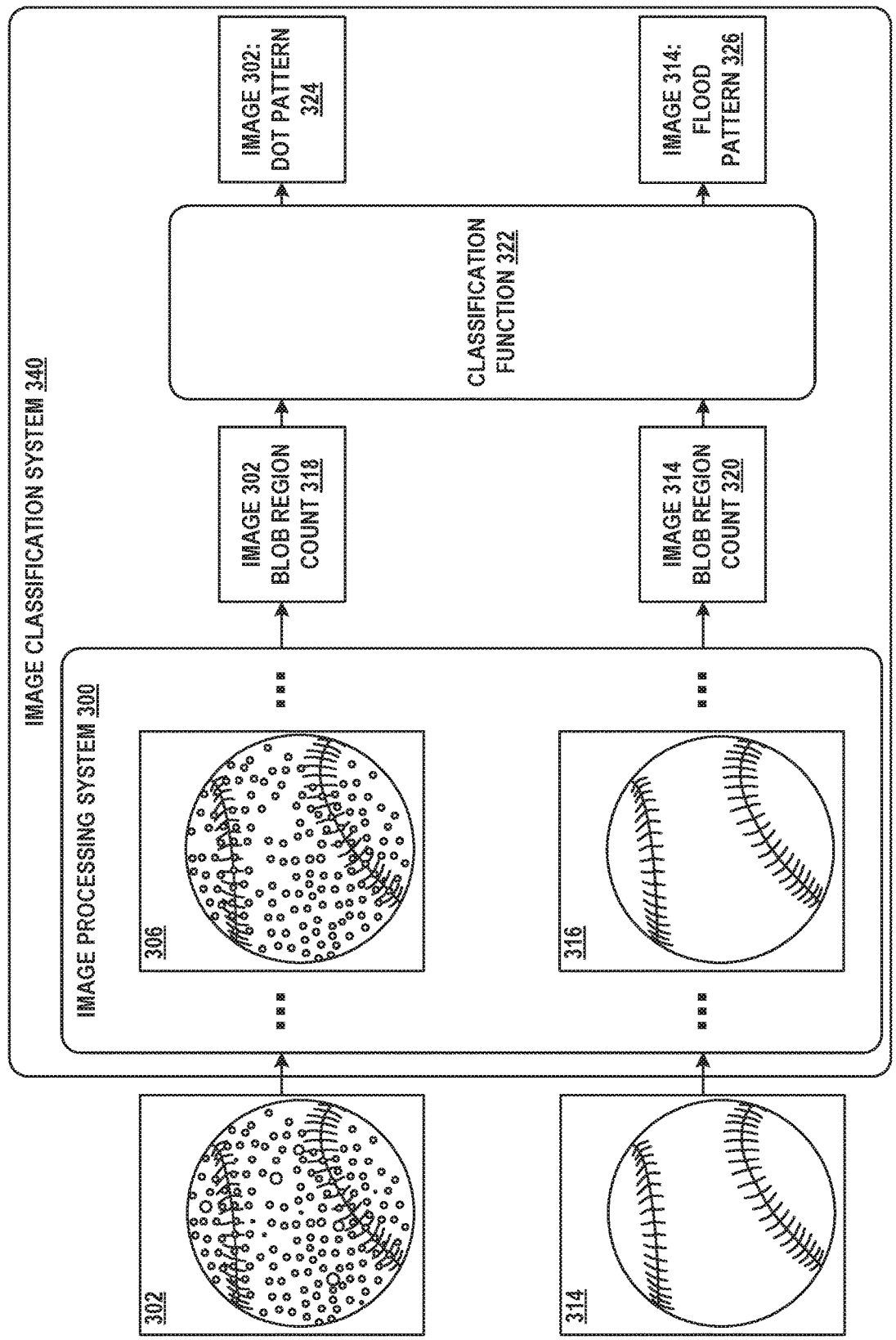
FIG. 3B illustrates an image classification system, in accordance with example embodiments.

FIG. 3B illustrates another application of the operations of image processing system 300. Namely, image processing system 300 may be applied to pairs of dot and flood infrared images to determine which of the images in the pair represents a dot pattern and which represents a flood pattern (or not pattern at all). To that end, image processing system 300 may be used as part of image classification system 340.

Specifically, image classification system 340 may be provided with infrared images 302 and 314 as input. It is apparent from FIG. 3B that infrared image 302 represents the object (i.e., the baseball) illuminated with a dot pattern, and infrared image 314 represents the object illuminated by a flood pattern (i.e., uniform illumination in which individual projections are not discernible) or by no pattern at all. However, this fact might not be known a priori to image classification system 340 (e.g., due to a lack of synchronization between projector and camera, interference between different subsystems of a device, or interference between different devices that utilize an infrared pattern projector and camera to determine depth). As such, the following operations may be carried out to determine which of infrared images 302 or 314 represents a dot pattern and which represents a flood pattern (or no pattern at all).

Namely, images 302 and 314 may be provided as input to image processing system 300. Image processing system 300 may execute the operations discussed with respect to FIG. 3A, generating difference of Gaussian images 306 and 316 in the process, and produce as output respective counts of the number of identified blob regions in images 302 and 314. That is, image processing system 300 may determine, for infrared image 302, blob region count 318 and, for infrared image 314, blob region count 320. Counts 318 and 320 may then be provided as input to classification function 322. Image processing system may also determine respective blob images corresponding to infrared images 302 (i.e., image 310) and 314 (not shown).

Classification function 322 may be configured to determine a type of pattern represented in infrared image 302 and in infrared image 314 based on blob region counts 318 and 320. To that end, classification function 322 may compute one or more metrics indicating whether infrared images 302 and 314 each represent a different infrared pattern (e.g., flood vs dot). In one example, the metric may be L=max(b1, b2)−w*min(b1, b2), where b1 represents blob region count 318, b2 represents blob region count 320, w represents a weighing factor, and L represents the likelihood that infrared images 302 and 314 represent different infrared patterns. In another example, the metric may be L=(max(b1, b2))/(min (b1, b2)+1).

Infrared images 302 and 314 may be determined to represent two different infrared patterns when the metric L exceeds a threshold confidence value (e.g., when the difference between b1 and b2 is large). The threshold confidence value may be determined experimentally based on analysis of a library of various image pairs. Specifically, the threshold confidence value may be selected to achieve a desired accuracy, false-positive rate, or false-negative rate. For example, the threshold confidence value may be selected such that when the metric L exceeds the threshold value, the classification of images is 100% accurate (i.e., a false-positive rate of 0%, while allowing for a non-zero false-negative rate).

When the metric L does not exceed the threshold confidence value, there might not be sufficient difference between the two infrared images to determine whether one represents a dot pattern and the other represents a flood pattern. This may be the case, for example, when both input infrared images are dot images, when both input infrared images are flood images (or images with no pattern at all), or when the dot pattern in one of the images is not sufficiently perceptible to detect a satisfactory number of dots therein, among other possibilities.

When the metric L exceeds the threshold confidence value, the images may be assigned a corresponding class or label based on the number of detected blob regions therein. That is, the image associated with max(b1, b2) (i.e., the image containing more blob regions) may be determined to represent the dot pattern and the image associated with min(b1, b2) (i.e., the image containing fewer blob regions) may be determined to represent the flood pattern (or no pattern at all). Thus, classification function 322 may determine that infrared image 302 represents the dot pattern, as indicated by block 324, and infrared image 314 represents the flood pattern, as indicated by block 326.

IV. Example Parameter Selection Operations

Figure 3C:
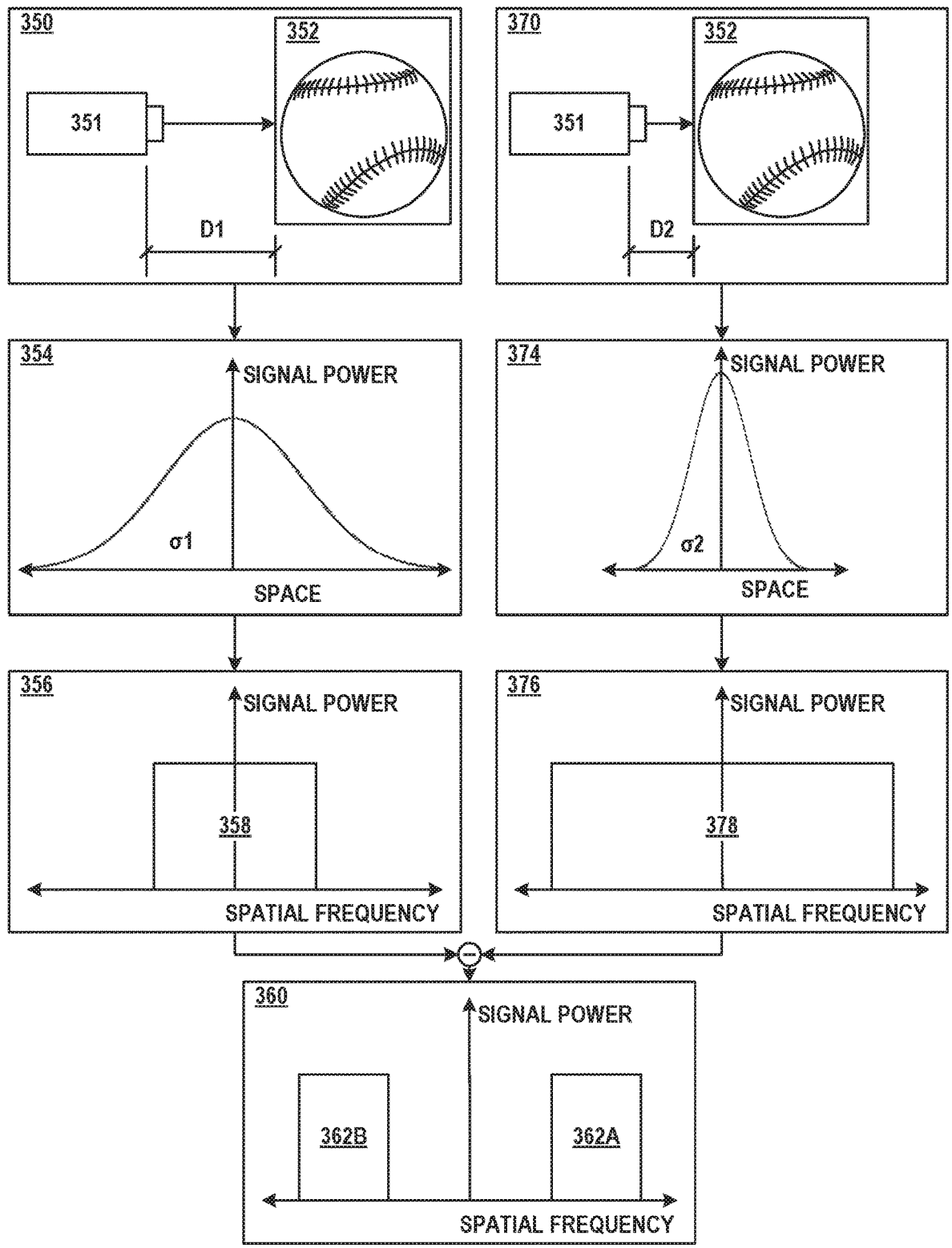
FIG. 3C illustrates a parameter selection process, in accordance with example embodiments.

Image processing system 300 and image classification system 340 may be configured to determine whether an image represents an object illuminated by an infrared pattern under a plurality of different conditions. Namely, systems 300 and 340 may be adapted to deal with a plurality of different distances between the infrared projector and the object at the time of capture of the infrared image. FIG. 3C illustrates an example process for selecting parameters for the operations carried out by systems 300 and 340 to accommodate a range of different distances between the infrared projector and the object.

Block 350 shows a maximum distance D1 between infrared projector 351 and object 352 (e.g., a baseball) that systems 300 and 340 are to accommodate. Similarly, block 370 shows a minimum distance D2 between infrared projector 351 and object 352 that systems 300 and 340 are to accommodate. Thus, when systems 300 and 340 are used as part of a facial recognition system, for example, a user may be allowed to hold the computing device that includes infrared projector 351 between distance D1 and D2 relative to the user's face in order to allow the computing device to recognize the user's face. Holding the computing device closer than distance D2 or further away than distance D1 may result in a projection with a spatial frequency that might not allow for facial recognition to be carried out based on the projected pattern.

Based on the desired maximum and minimum distances D1 and D2, respectively, the first and second Gaussian operators may be selected. Specifically, the first Gaussian operator may be computed using a first Gaussian distribution that has a first standard deviation $\sigma 1$, as show in block 354, such that the Gaussian operator acts as a low-pass filter having the frequency characteristics shown in block 356. That is, first standard deviation $\sigma 1$ may be selected such that the cut-off frequency of frequency band 358 excludes spatial frequencies resulting from distances (between projector 351 and object 352) closer than D1. The specific value of $\sigma 1$ may depend on the density of the infrared pattern since this density determines the spatial frequency of the projected pattern elements at a particular distance.

Similarly, the second Gaussian operator may be computed using a second Gaussian distribution that has a second standard deviation $\sigma 2$, as show in block 374, such that the Gaussian operator acts as a low-pass filter having the frequency characteristics shown in block 376. That is, second standard deviation $\sigma 2$ may be selected such that the cut-off frequency of frequency band 378 excludes spatial frequencies resulting from distances (between projector 351 and object 352) closer than $\sigma 2$. Again, the specific value of $\sigma 2$ may depend on the density of the infrared pattern. Because D2 is smaller than D1, $\sigma 2$ is smaller than $\sigma 1$ and frequency band 358 is wider than frequency band 378.

The Gaussians (i.e., normal distributions) in block 354 and 374 are shown in two dimensions for illustrative purposes. However, it is to be understood that the Gaussian operators used in practice during image processing are determined based on three-dimensional Gaussian distributions. For example, the Gaussian operators may be 5 by 5 squares, referred to as kernels, with each element or "pixel" of the kernel representing a corresponding value from the Gaussian distribution.

When a difference of Gaussian image is computed, this amounts to computing a difference between frequency bands 378 and 358, resulting in frequency bands 362A and 362B, as shown in block 360. Frequency bands 362A and 362B represent a band pass filter, with frequency band 362A preserving positive frequencies therein and frequency band 362B preserving negative frequencies therein. By adjusting the values of $\sigma 1$ and $\sigma 2$, size and position of frequency bands 362A and 362B can be adjusted, thus altering the values of distances D1 and D2 from which a pattern can be projected onto object 352.

V. Example Applications

Figure 4A:
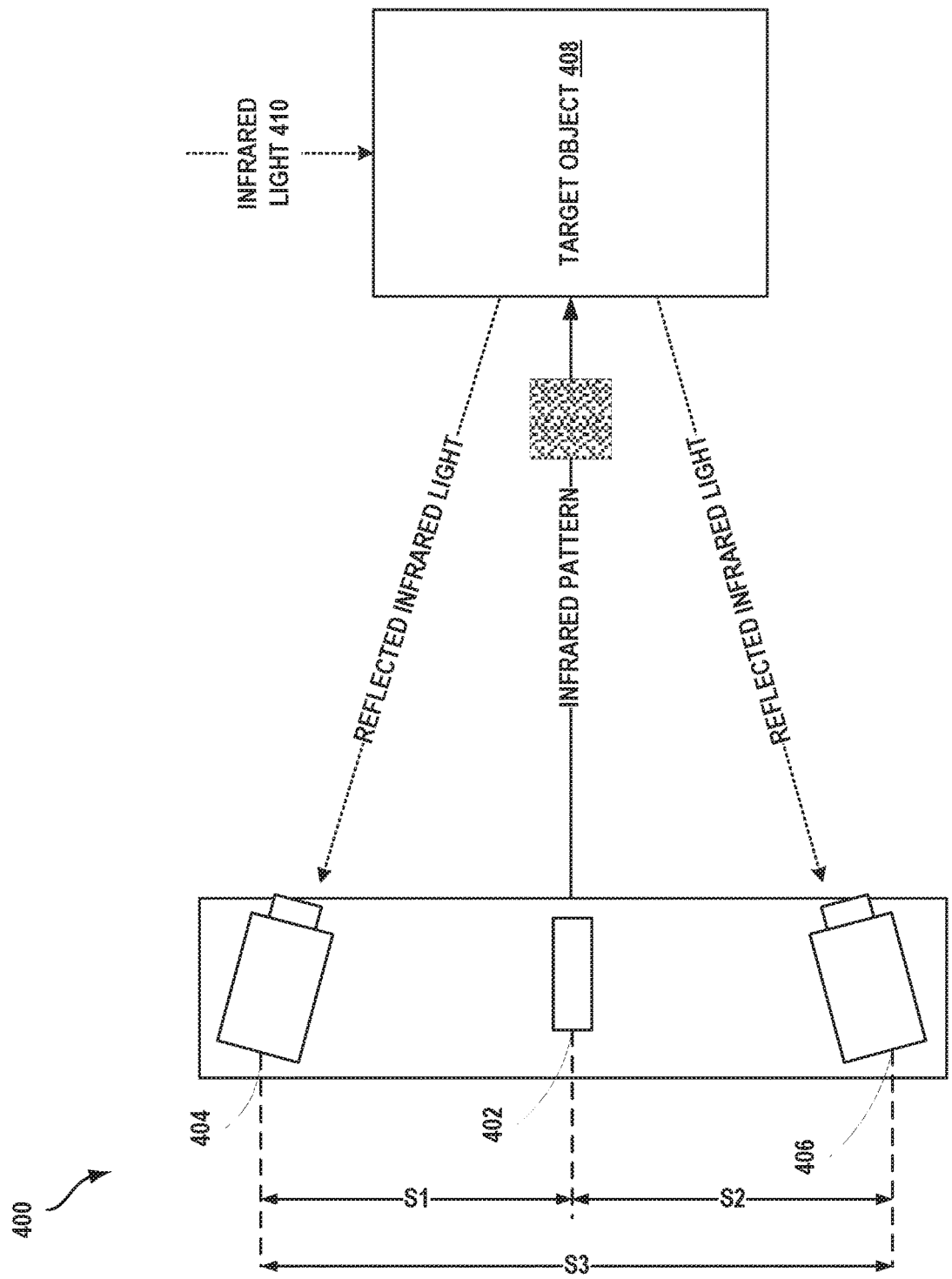
FIG. 4A illustrates a stereoscopic imaging system, in accordance with example embodiments.
Figure 4B:
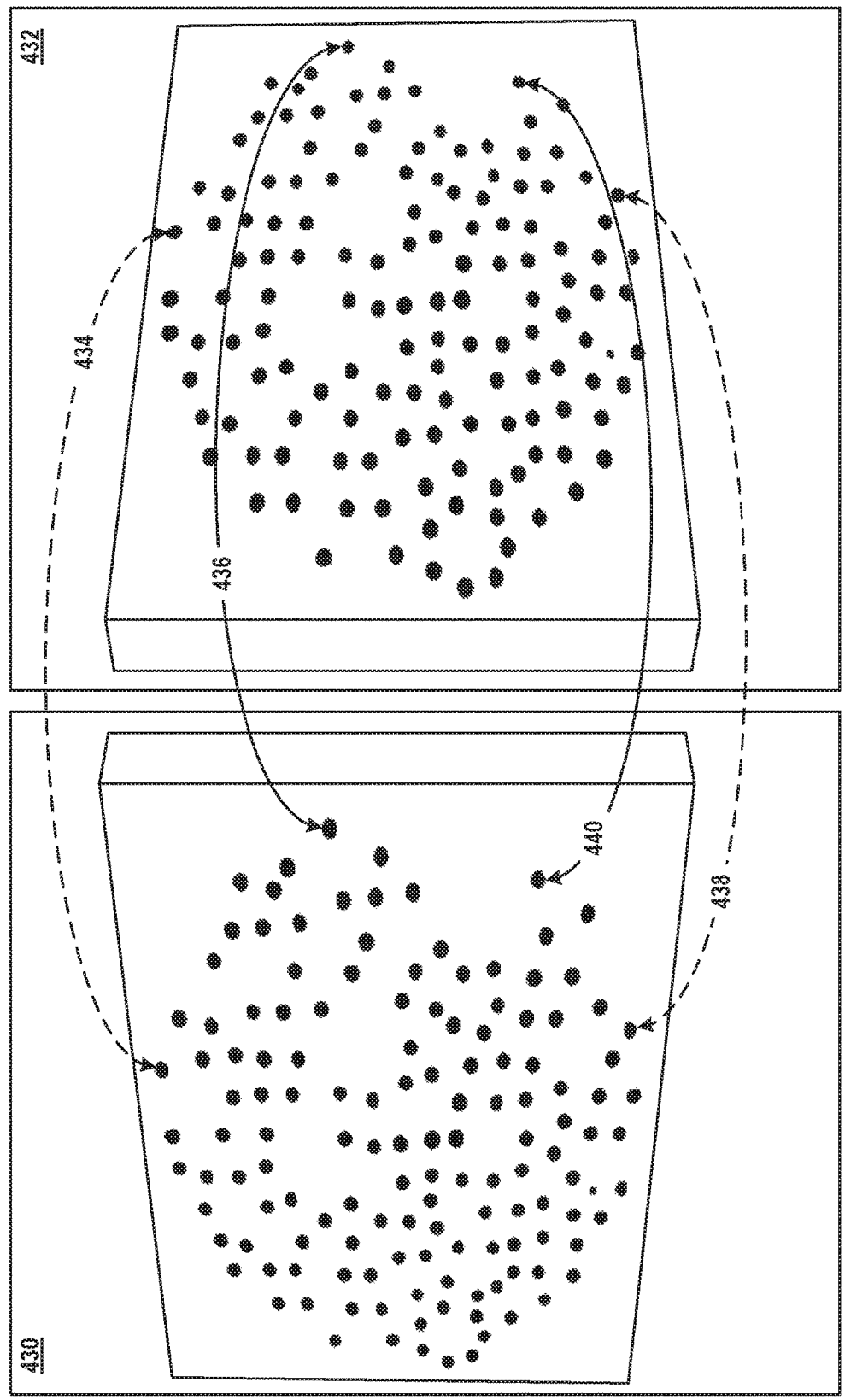
FIG. 4B illustrates a mapping between two images, in accordance with example embodiments.

FIGS. 4A and 4B illustrate an additional example application in which systems 300 and 340 may be used to detect blob regions representing infrared patterns. Specifically, these systems may be used to enhance the operations of stereoscopic depth measurements that utilize an infrared structured light projector.

FIG. 4A illustrates an example stereoscopic imaging system 400 that includes infrared projector 402, first image sensor 404, and second image sensor 406. First image sensor 404 may be separated from infrared projector 402 by distance S1, second image sensor 406 may be separated from infrared projector 402 by distance S2, and first image sensor 404 may be separated from second image sensor 406 by distance S3. First image sensor 404 and second image sensor 406 may observe target object 408 (and parts of the surrounding environment) from different angles (i.e., from different perspectives). Thus, first image sensor 404 may be used to capture images of target object 408 from a first viewpoint, while second image sensor 406 may be used to capture images of target object 408 from a second viewpoint. First image sensor 404 and second image sensor 406 may each be configured to capture infrared light images.

Target object 408 may be at least partially illuminated by an infrared pattern projected from infrared projector 402. Target object 408 may also be at least partially illuminated by infrared light 410 from other sources such as sunlight or infrared-spectrum artificial lighting (e.g. from an infrared flood projector on another device among other possible infrared light sources.

During operation, first image sensor 404 may capture an infrared light image that represents the infrared pattern reflected off target object 408. From a different viewpoint, second image sensor 406 may capture an infrared light image representing the infrared pattern reflected off target object 408.

A computing device may generate a depth image based on the two infrared images captured by first image sensor 404 and second image sensor 406. This may involve finding mappings of corresponding features (e.g., areas of pixels) within the two infrared images and calculating how far apart these features reside in pixel space. The computing device may use triangulation (based on, for example, the distance D3 between the two image sensors) to determine a depth map or image. This depth map or depth image may contain information relating to the distances of surfaces of target object 408 based on features detected from the reflected infrared light (including the infrared projected pattern).

In some embodiments, a depth map may be determined based on a single infrared light image captured by either first image sensor 404 or second image sensor 406. For example, a computing device may employ triangulation techniques based on (i) the known distance between infrared projector 402 and first image sensor 404 and (ii) the captured infrared image of the dot pattern projected onto target object 408 by first image sensor 404 to determine the depth map. Any combination of known distances D1, D2, and D3 and one or more infrared images captured by first image sensor 404 and/or second image sensor 406 may be used to determine a depth map.

Notably, however, multiple infrared light images captured from different viewpoints may provide additional information that can be used to refine or verify the accuracy of the depth sensing. Thus, the computing device may rely on two infrared images captured substantially simultaneously (e.g., within 1 second of one another) by first image sensor 404 and second image sensor 406 in determining the depth map.

Systems 300 and 340 may be used to assist with determination of the depth map by finding in the two substantially simultaneously-captured infrared images corresponding features. For example, systems 300 and 340 may form part of or be used in combination with stereoscopic imaging system 400. Specifically, the corresponding features may be or may be found based on the positions of the detected blob regions in each image, as illustrated in FIG. 4B. That is, the detected blob regions may provide stable reference points to be used in determining the correspondence between two infrared images captured from different perspectives. Using the operations herein described, the blob regions may be easier to detect than, for example, natural physical features of target object 408 or the environment.

FIG. 4B shows first image 430 of an object (i.e., a rectangular surface) and second image 432 of the object. Each of images 430 and 432 is a blob region image in which respective blob regions have been identified by image processing system 300. Further, each of blob region images 430 and 432 is determined based on a corresponding infrared image captured by stereoscopic imaging system 400. Namely, blob region image 430 is based on a first infrared image captured by second image sensor 406 (from one perspective) and blob region image 432 is based on a second infrared image captured by first image sensor 404 (from another perspective).

Since the infrared images are captured substantially simultaneously by stereoscopic imaging system 400, images 430 and 432 each represent the object in the same position and illuminated by the same infrared dot pattern. Accordingly, individual detected blob regions may be used to determine the mapping between features represented in image 430 and 432. For example, arrows 434, 436, 438, and 440 illustrate a mapping (i.e., a correspondence) between a subset of the blob regions detected in images 430 and 432. Similar mappings may be determined for each remaining blob region based on the position of the blob region within the pattern.

Since each pair of blob regions of this subset represents a pattern element projected onto a particular physical feature of the object, the difference in pixel position between the two blob regions that form a pair may be used to determine the image disparity. Determination of the image disparity may, in turn, allow for depth triangulation to various physical features of the target object. Notably, the detected blob regions provide easily-discernible reference points for calculating the disparity between two stereoscopic images. Thus, using the blob regions to find the image disparity may require fewer computational resources than, for example, relying on detecting and mapping of physical features of the object represented in the two stereoscopic images to determine the corresponding areas of these two images.

VI. Example Machine Learning Classification System

In some cases, image classification system 340 discussed with respect to FIG. 3B may be unable to accurately determine whether an infrared image represents a dot pattern or a flood pattern (or no pattern at all). In some applications, when this occurs, a computing device may be able to discard the infrared images that cannot be accurately classified and acquire new images. The new images may, for example, include an infrared pattern that has been projected onto the object with a higher power, thus making it move easily discernible. New images may be acquired (and, e.g., the power with which the pattern is projected may be increased), for example, until classification system 340 is able to successfully classify these new images. In some applications, however, each infrared image may necessitate accurate classification and thus acquisition of new images might not be a suitable alternative to accurate classification.

Figure 5:
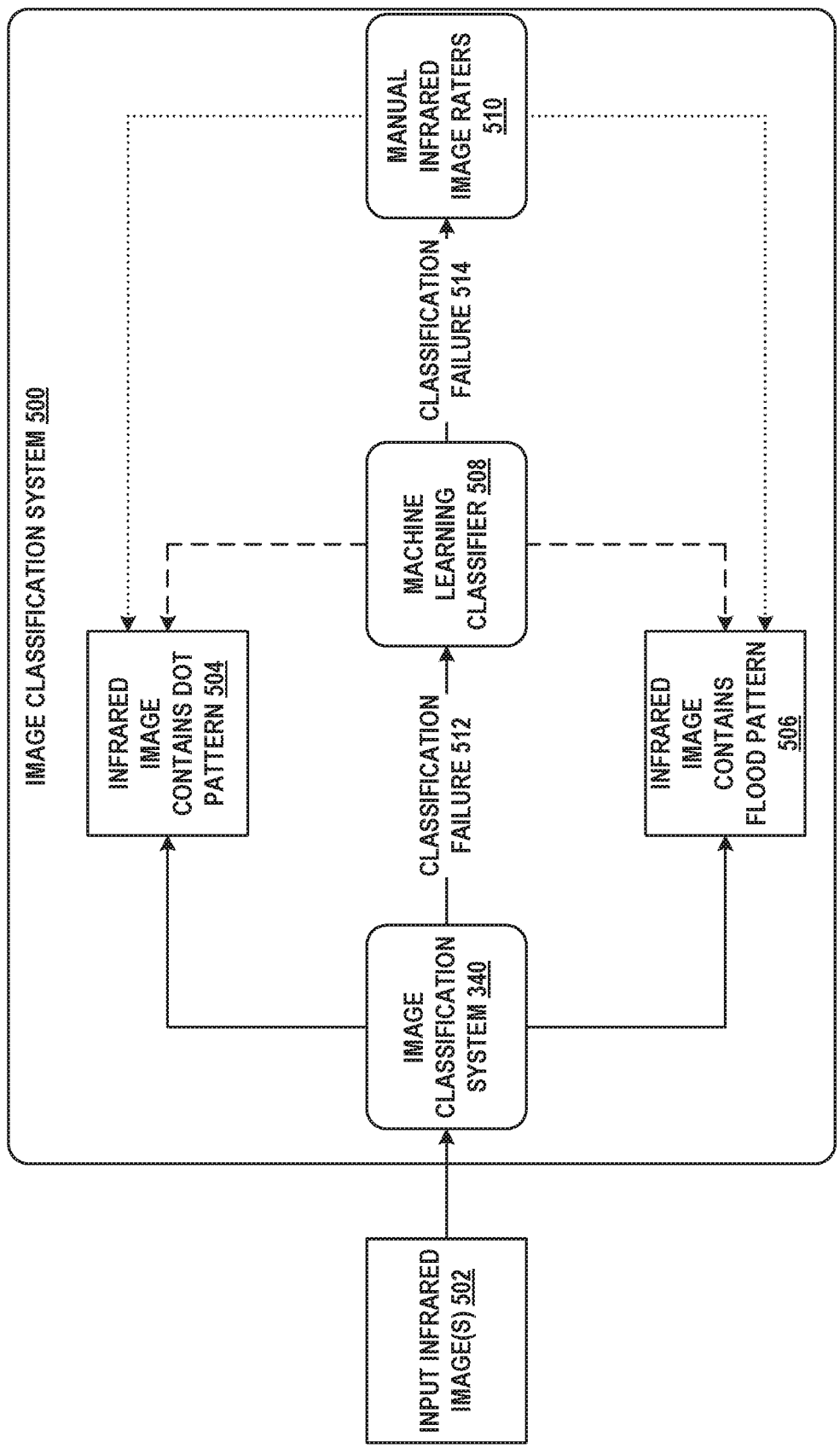
FIG. 5 illustrates an image classification system, in accordance with example embodiments.

FIG. 5 illustrates image classification system 500 that provides additional mechanisms for classifying infrared images beyond image classification system 340. Image classification system 500 may be used in applications where each of infrared image(s) 502 provided to image classification system 340 necessitates an accurate classification thereof. For example, infrared image(s) 502 may represent a library of images to be used in training and testing various algorithms and may necessitate that each image therein be correctly identified as either a dot pattern image or a flood pattern image (or an image lacking any infrared pattern). In such a case, increasing the power of the infrared projector and capturing additional images might not be a suitable alternative since image capture and image analysis occur at different and separate times.

Accordingly, image classification system includes machine learning classifier 508 and manual infrared image raters 510. Image classification system 340 may be able to accurately label subset (e.g., 98%) of input infrared image(s) 502 as either infrared images that contain a dot pattern, as indicated by block 504, or infrared images that contain a flood pattern, as indicated by block 506. When, however, image classification system 340 is unable to classify an image with a sufficient confidence level, as indicated by arrow 512, this image may be provided as input to machine learning classifier 508.

Machine learning classifier 508 may be a pre-trained machine learning algorithm or model configured to classify infrared images among those representing a dot pattern and those representing a flood pattern. Machine learning classifier 508 may be trained using examples of correctly-classified infrared images. Namely, an image correctly classified as a dot image may, in fact, represent an object illuminated by a dot pattern while an image correctly classified as a flood image may, in fact, represent the object illuminated by a flood pattern. Notably, the trained machine learning classifier 508 may be configured to classify infrared images that it has not previously encountered or trained on. Machine learning classifier 508 may include or may alternatively be another type of algorithm capable of learning based on prior examples or other feedback.

When a confidence value associated with the classification by machine learning classifier 508 exceeds a corresponding threshold confidence value (which may be different from that used by image classification system 340), the image may be assigned a corresponding identifier (e.g., as indicated by block 504 or 506). On the other hand, when this confidence value does not exceed the corresponding threshold confidence value, as indicated by arrow 514, the image may be provided to manual infrared image raters 510 for manual classification. Manual infrared image raters 510 may include users that visually inspect the infrared image and manually assign a corresponding label thereto.

Notably, in some implementations, when the confidence value of machine learning classifier 508 does not exceed the corresponding threshold value but the classification generated by machine learning classifier 508 is the same as that generated by image classification system 340, the image may be labeled accordingly and might not be passed to manual infrared image raters 510. Similarly, when the confidence value of machine learning classifier 508 exceeds the corresponding threshold value but the classification generated by machine learning classifier 508 is not the same as that generated by image classification system 340, the image may be passed to manual infrared image raters 510.

Thus, in general, infrared image(s) 502 may be classified according to a weighted sum of the confidence values determined by image classification system 340, machine learning classifier 508, and manual infrared image raters 510. Other similar variations are possible.

Figure 6:
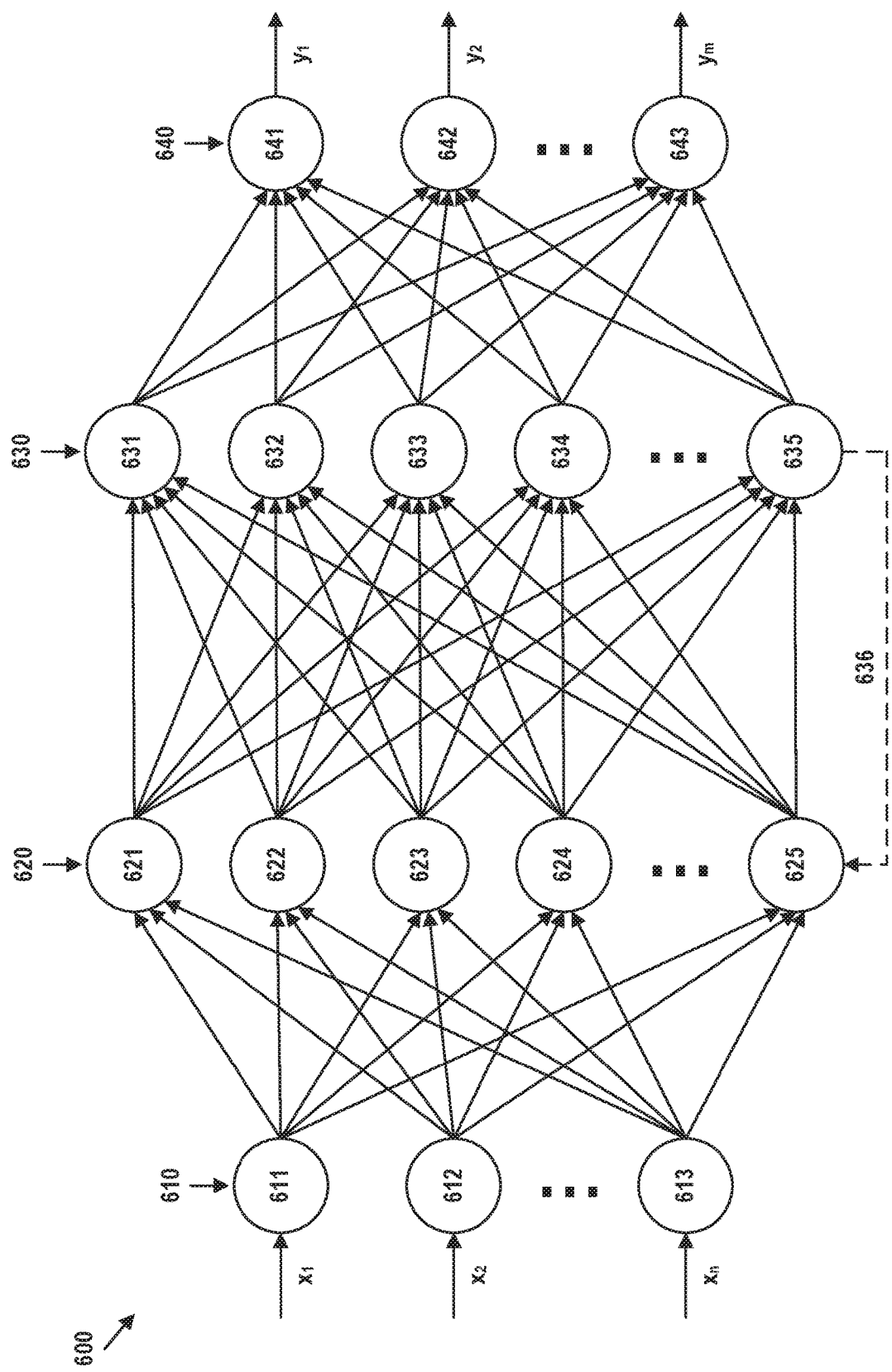
FIG. 6 illustrates an artificial neural network, in accordance with example embodiments.

FIG. 6 illustrates artificial neural network (ANN) 600, which provides an example implementation of machine learning classifier 508. ANN 600 may include input nodes 611, 612, and 613 that form part of input layer 610 of ANN 600 and are configured to accept inputs $x_1$ and $x_2$ through $x_n$, respectively. In some embodiments, the number of inputs n may be equal to the number of pixels in an infrared image. In the case of an infrared image with M columns and N rows of pixels, n may be equal to M×N.

ANN 600 may additionally include a plurality of hidden nodes that form part of one or more hidden layers 620 and 630. Hidden nodes 621, 622, 623, 624 and 625 may form first hidden layer 620 while hidden nodes 631, 632, 633, 634, and 635 may form second hidden layer 630. In some examples, ANN 600 may include additional hidden nodes and additional hidden layers not shown herein. The number of hidden nodes and hidden layers may be determined empirically during training of ANN 600 to achieve an ANN that classifier infrared images with a satisfactory accuracy (i.e., an accuracy greater than a threshold accuracy).

Notably, the terms "hidden node" and "hidden layer" are used herein to designate nodes and layers, respectively, located between the input and output layers of the ANN. These and similar terms are not to be construed as implying that values, functions, or other properties associated with the hidden nodes or layers are necessarily unknown or hidden.

ANN 600 may further include output nodes 641, 642, and 643 that form part of an output layer 640 of ANN 600. Output nodes 641, 642, and 643 may be configured to provide outputs $y_1$, $y_2$, and $y_m$, respectively. When one infrared image is provided to ANN 600 as input, the output of ANN 600 may be a single value indicating the likelihood that this infrared image represents a dot pattern rather than a flood pattern. On the other hand, when a dot infrared image and a flood infrared image are both (e.g., at the same time, as per FIG. 3B) provided to ANN 600 as input, the output of ANN 600 may be two values: one indicating the classification of the first of these images and the second indicating the confidence associated with this classification.

The nodes of ANN 600 may be connected with one another, as illustrated by the arrows in FIG. 6. For example, input nodes 611-613 may be connected to hidden nodes 621-625 of the first hidden layer 620 (i.e., input layer 610 may be connected to hidden layer 620), hidden nodes 621-625 may be connected to hidden nodes 631-635 of the second hidden layer 630 (i.e., hidden layer 620 may be connected to hidden layer 630), and hidden nodes 631-635 may be connected to output nodes 641-643 (i.e., hidden layer 630 may be connected to output layer 640). In some embodiments, each node of a layer may be connected to each node within a subsequent layer (e.g., node 624 may be connected to each of nodes 631-635). Alternatively, some nodes within a layer may be unconnected to one or more nodes within a subsequent layer. Some nodes may additionally be provided with a constant bias signal (not shown).

One or more of the hidden nodes may represent feature filters configured to filter the input infrared image(s) for specific features (e.g., vertical lines, horizontal lines, curves, edges, etc.). The filters may become increasingly complex, filtering for higher-order features, as the hidden nodes of ANN 600 are traversed.

In further embodiments, nodes within a layer may be connected back to nodes within a previous layer or within the same layer. For example, node 635 within layer 630 may be connected to node 625 within prior layer 620 by way of connection 636. In another example, node 635 within layer 630 may be connected to at least one of nodes 631, 632, 633, or 634 within layer 630 (not shown). Thus, ANN 600 may include feedback that creates internal state within the network. This type of ANN may be referred to as a recurrent artificial neural network (RANK). Notably, an ANN without any feedback paths may be referred to as a feedforward artificial neural network (FF-ANN).

Each connection between nodes of ANN 600 may be associated with a respective weighting value. A given node may receive inputs $a_1$, $a_2$, through $a_k$. Each of inputs $a_1$, $a_2$, through $a_k$ may be associated with corresponding weighting values $w_1$, $w_2$, through $w_k$, respectively. The given node may operate by first taking the sum of the respective products of each input multiplied by the corresponding weighting value. The given node may thus compute the sum $\varphi = w_1 a_1 w_2 a_2 + \ldots + w_k a_k$. The sum $\varphi$ may then be passed through an activation function to produce the output of the given node. Example activation functions may include a linear activation function where the node output is linearly proportional to the sum $\varphi$, a Gaussian activation function where the node output is normally distributed along a bell curve according to the sum $\varphi$, a sigmoidal activation function where the sum p is mapped to a bounded range of node outputs, or a Rectified Linear Units (RELu) function where the node output is max $(0, \varphi)$.

In some embodiments, ANN 600 may be or may include therein aspects of a convolutional artificial neural network (CANN). For example, ANN 600 may include pooling layers (i.e., downsampling layers) between layers 610, 620, 630, and 640. Further, ANN 600 may additionally include aspects of probabilistic neural networks, time-delay neural networks, regulatory feedback neural networks, and spiking neural networks, among other types of neural networks not herein discussed.

The output of the given node may be provided as input to other nodes within ANN 600. At each respective node to which the output of the given node is connected, this output may be multiplied by a corresponding weighting value and summed along with other inputs to the respective node. For example, the output of node 621 may be provided to node 635. The output of node 621 may be multiplied by a weighting value associated with the connection between node 621 and 635. This product may then be summed at node 635 along with the product of the output of node 622 and the weighting value between node 622 and node 635, the product of the output of node 623 and the weighting value between node 623 and node 635, the product of the output of node 624 and the weighting value between node 624 and node 635, and the product of the output of node 625 and the weighting value between node 625 and node 635. The sum may be passed through an activation function to determine the output of node 635. The output of node 635 may then be provided to nodes 641, 642, and 643.

The weighting values between interconnected nodes may be determined by training ANN 600 based on a plurality of correctly-classified infrared images, among other training data that may be associated therewith. The training of ANN 600 may be performed by, for example, backpropagation (e.g., classical backpropagation, backpropagation with momentum, Gauss-Jacobi backpropagation, Gauss-Seidel backpropagation, etc.).

VII. Additional Example Operations

Figure 7:
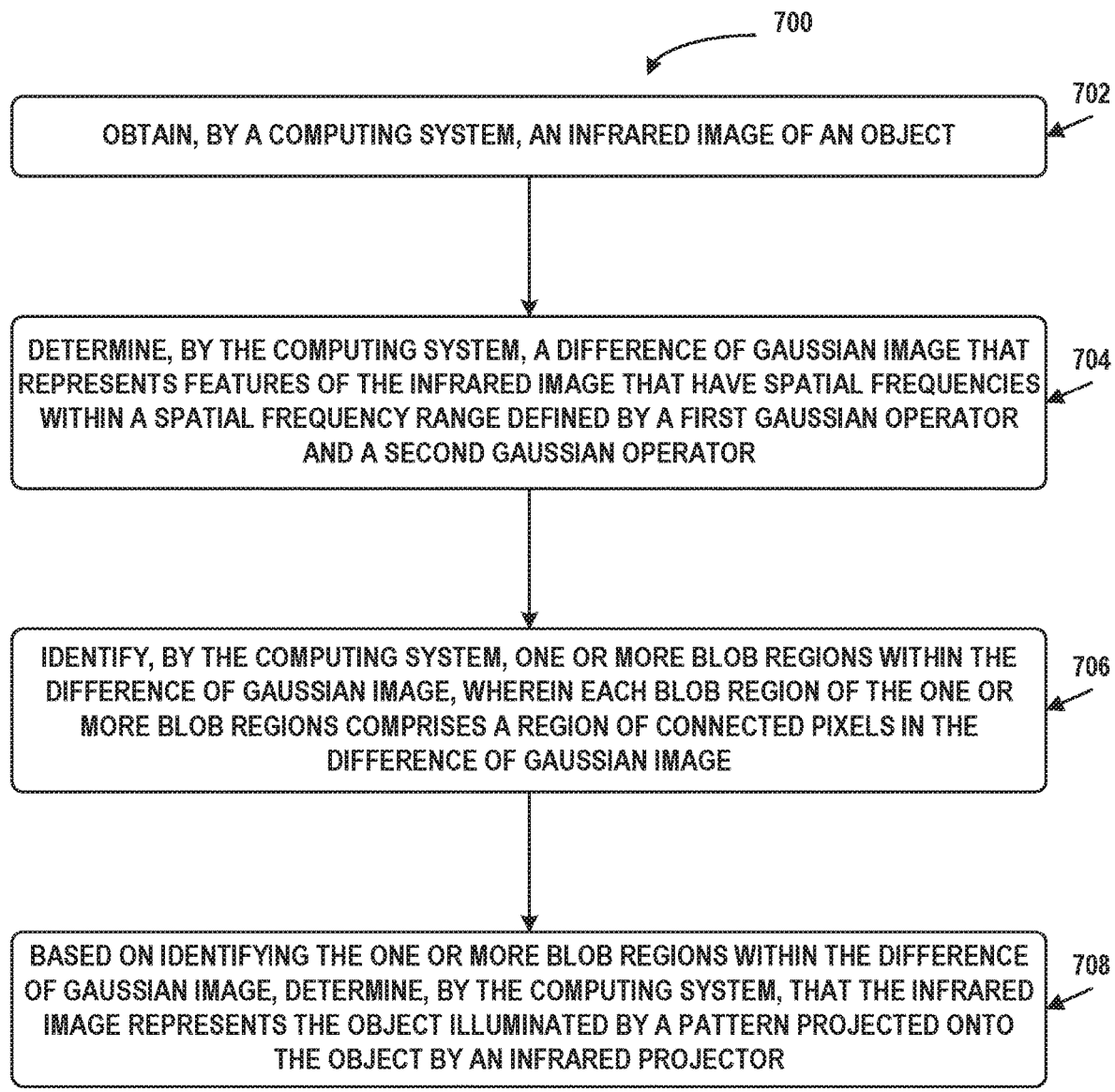
FIG. 7 illustrates a flow chart, in accordance with example embodiments.

FIG. 7 illustrates flow chart 700 of operations related to identifying structured light patterns in infrared images. The operations may be carried out by infrared image capture system 100 or computing device 200, image processing system 300, image classification system 340, stereoscopic imaging system 400, or image classification system 500, among other possibilities. The operations may be similar to and may include variations of the operations discussed with respect to FIGS. 1-6.

Block 702 may involve obtaining, by a computing system, an infrared image of an object.

Block 704 may involve determining, by the computing system, a difference of Gaussian image that represents features of the infrared image that have spatial frequencies within a spatial frequency range defined by a first Gaussian operator and a second Gaussian operator.

Block 706 may involve identifying, by the computing system, one or more blob regions within the difference of Gaussian image. Each blob region of the one or more blob regions may include a region of connected pixels in the difference of Gaussian image.

Block 708 may include, based on identifying the one or more blob regions within the difference of Gaussian image, determining, by the computing system, that the infrared image represents the object illuminated by a pattern projected onto the object by an infrared projector.

In some embodiments, obtaining the infrared image may involve operating the infrared projector to project the pattern onto the object and operating an infrared image sensor to capture the infrared image.

In some embodiments, determining that the infrared image represents the object illuminated by the pattern projected onto the object by the infrared projector may involve determining that a number of the one or more blob regions exceeds a threshold number. Based on the number of the one or more blob regions exceeding the threshold number, the computing system may determine that the infrared image represents the object illuminated by a dot pattern.

In some embodiments, determining that the infrared image represents the object illuminated by the pattern projected onto the object by the infrared projector may include determining that a number of the one or more blob regions does not exceed a threshold number. Based on the number of the one or more blob regions not exceeding the threshold number, the computing system may determine that the infrared image represents the object illuminated by a flood pattern.

In some embodiments, the infrared projector may be a first infrared projector, the infrared image may be a first infrared image, the difference of Gaussian image may be a first difference of Gaussian image, the one or more blob regions may be one or more first blob regions. The computing system may obtain a second infrared image of the object and determine a second difference of Gaussian image that represents features of the second infrared image that have spatial frequencies within the spatial frequency range. The computing system may identify one or more second blob regions within the second difference of Gaussian image. Each blob region of the one or more second blob regions may include a region of connected pixels in the second difference of Gaussian image. Based on identifying the one or more first blob regions within the first difference of Gaussian image and the one or more second blob regions within the second difference of Gaussian image, the computing system may determine that (i) the first infrared image represents the object illuminated by a dot pattern projected onto the object by the first infrared projector and (ii) the second infrared image represents the object illuminated by a flood pattern projected onto the object by a second infrared projector.

In some embodiments, determining that (i) the first infrared image represents the object illuminated by the dot pattern and (ii) the second infrared image represents the object illuminated by the flood pattern may involve determining a first number of the one of more first blob regions, determining a second number of the one or more second blob regions, determining that the first number exceeds the second number and, based on the first number exceeding the second number, determining that the first infrared image represents the object illuminated by the dot pattern and the second infrared image represents the object illuminated by the flood pattern.

In some embodiments, determining that the first number exceeds the second number may involve determining a difference between the first number and the second number and determining that the difference exceeds a threshold difference value.

In some embodiments, determining that the first number exceeds the second number may involve determining a ratio between the first number and the second number and determining that the ratio exceeds a threshold ratio value.

In some embodiments, the infrared image may be a first infrared image captured by a first image sensor, the difference of Gaussian image may be a first difference of Gaussian image, the one or more blob regions may be one or more first blob regions. The computing system may obtain a second infrared image of the object. The second infrared image may be captured substantially simultaneously with the first infrared image by a second image sensor. The first infrared image and the second infrared image may each represent the object from different perspectives. The computing system may determine a second difference of Gaussian image that represents features of the second infrared image that have spatial frequencies within the spatial frequency range. The computing system may identifying one or more second blob regions within the second difference of Gaussian image. Each blob region of the one or more second blob regions may include a region of connected pixels in the second difference of Gaussian image. Based on identifying the one or more first blob regions within the first difference of Gaussian image and the one or more second blob regions within the second difference of Gaussian image, the computing system may determine that the first infrared image and the second infrared image each represent the object illuminated by a dot pattern projected onto the object by the infrared projector.

In some embodiments, based on determining that the first infrared image and the second infrared image each represent the object illuminated by a dot pattern, the computing system may determine a spatial correspondence between representations of physical features of the object in the first infrared image and the second infrared image. Based on the spatial correspondence, the computing system may determine a distance between one or more of the physical features of the object and one or more of the first image sensor or the second image sensor.

In some embodiments, determining the spatial correspondence may involve, for at least one of the one or more first blob regions, determining a corresponding blob region of the one or more second blob regions that represents a dot projected onto a particular physical feature of the object by the infrared projector.

In some embodiments, based on (i) determining that the infrared image represents the object illuminated by the pattern and (ii) positions of the one or more blob regions in the infrared image, the computing system may determine a depth of one or more physical features of the object.

In some embodiments, identifying the one or more blob regions within the difference of Gaussian image may involve identifying, within the difference of Gaussian image, one or more regions of connected pixels that (i) contain between a first number of pixels and a second number of pixels and (ii) have a circularity greater than a circularity threshold.

In some embodiments, a first standard deviation of the first Gaussian operator may define a first spatial frequency threshold and a second standard deviation of the second Gaussian operator may define a second spatial frequency threshold. The spatial frequency range may be defined by a range of spatial frequencies between the first spatial frequency threshold and the second spatial frequency threshold.

In some embodiments, based on identifying the one or more blob regions within the difference of Gaussian image, the computing system may determine at least one of (i) a number of the one or more blob regions or (ii) a density of the one or more blob regions. The computing system may adjust a power with which the infrared projector projects the pattern onto the object based on at least one of (i) the number of the one or more blob regions falling below a threshold value or (ii) the density of the one or more blob regions falling below a threshold density.

In some embodiments, the infrared projector may be a first infrared projector configured to project a dot pattern, the infrared image may be a first infrared image, the difference of Gaussian image may be a first difference of Gaussian image, the one or more blob regions may be one or more first blob regions. The computing system may obtain a second infrared image of the object. The second infrared image may be captured before the first infrared image. The computing system may determine a second difference of Gaussian image that represents features of the second infrared image that have spatial frequencies within the spatial frequency range. The computing system may identify one or more second blob regions within the second difference of Gaussian image. Each blob region of the one or more second blob regions includes a region of connected pixels in the second difference of Gaussian image. Based on identifying the one or more second blob regions within the second difference of Gaussian image, the computing system may determine that the second infrared image represents the object illuminated by a flood pattern projected onto the object by a second infrared projector. Based on determining that the second infrared image represents the object illuminated by a flood pattern, the computing system may obtain the first infrared image.

In some embodiments, determining that the infrared image represents the object illuminated by the pattern may involve determining that a number of the one or more blob regions is insufficient to determine that the infrared image represents the object illuminated by the pattern. Based on determining that the number of the one or more blob regions is insufficient, the infrared image may be provided to an artificial neural network (ANN) configured to determine whether a particular infrared image represents the object illuminated by the pattern. The computing system may receive, from the ANN, determination that the infrared image represents the object illuminated by the pattern.

VIII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

Where example embodiments involve information related to a person or a device of a person, some embodiments may include privacy controls. Such privacy controls may include, at least, anonymization of device identifiers, transparency, and user controls. For example, embodiments may include functionality that would enable users to modify or delete information relating to the user's use of a product.

Further, in situations where embodiments discussed herein collect personal information related to users, or may make use of personal information, the users may be provided with an opportunity to control whether programs or features collect user information (e.g., information about a user's physiology, social network, social actions or activities, profession, a user's preferences, or a user's current location). Thus, users may choose to opt-out of sharing any of the data herein discussed.

In addition, certain data may be treated in one or more ways before it is stored or used, so that personally identifiable information is removed. For example, a user's identity may be treated so that no personally identifiable information can be determined for the user (e.g., from a photo representing the user's face), or a user's geographic location may be generalized where location information is obtained (such as to a city, ZIP code, or state level), so that a particular location of a user cannot be determined. Thus, the user may have control over how information is collected about the user and used by any of the embodiments herein discussed.

What is claimed is:

1. A method of differentiating between dot and flood pattern illumination of an object comprising:
   obtaining, by a computing system, an infrared image of the object;
   determining, by the computing system, a difference of Gaussian image that represents features of the infrared image that have spatial frequencies within a spatial frequency range defined by a first Gaussian operator and a second Gaussian operator;
   identifying, by the computing system, one or more blob regions within the difference of Gaussian image, wherein each blob region of the one or more blob regions comprises a region of connected pixels in the difference of Gaussian image; and
   based on identifying the one or more blob regions within the difference of Gaussian image, determining, by the computing system, whether the infrared image represents the object illuminated by a dot pattern or a flood pattern projected onto the object by one or more infrared projectors.

2. The method of claim 1, wherein obtaining the infrared image comprises:
   operating the one or more infrared projectors to project the dot pattern or the flood pattern onto the object; and
   operating an infrared image sensor to capture the infrared image.

3. The method of claim 1, wherein determining whether the infrared image represents the object illuminated by the dot pattern or the flood pattern projected onto the object by the one or more infrared projectors comprises:
   determining whether a number of the one or more blob regions exceeds a threshold number;
   determining that the infrared image represents the object illuminated by the dot pattern if the number of the one or more blob regions exceeds the threshold number; and determining that the infrared image represents the object illuminated by the flood pattern if the number of the one or more blob regions does not exceed the threshold number.

4. The method of claim 1, wherein the one or more infrared projectors comprise a first infrared projector and a second infrared projector, wherein the infrared image is a first infrared image, wherein the difference of Gaussian image is a first difference of Gaussian image, wherein the one or more blob regions are one or more first blob regions, and wherein the method further comprises:
obtaining a second infrared image of the object;
determining a second difference of Gaussian image that represents features of the second infrared image that have spatial frequencies within the spatial frequency range;
identifying one or more second blob regions within the second difference of Gaussian image, wherein each blob region of the one or more second blob regions comprises a region of connected pixels in the second difference of Gaussian image; and
based on identifying the one or more first blob regions within the first difference of Gaussian image and the one or more second blob regions within the second difference of Gaussian image, determining that (i) the first infrared image represents the object illuminated by the dot pattern projected onto the object by the first infrared projector and (ii) the second infrared image represents the object illuminated by the flood pattern projected onto the object by the second infrared projector.

5. The method of claim 4, wherein determining that (i) the first infrared image represents the object illuminated by the dot pattern and (ii) the second infrared image represents the object illuminated by the flood pattern comprises:
determining a first number of the one of more first blob regions;
determining a second number of the one or more second blob regions;
determining that the first number exceeds the second number; and
based on the first number exceeding the second number, determining that the first infrared image represents the object illuminated by the dot pattern and the second infrared image represents the object illuminated by the flood pattern.

6. The method of claim 5, wherein determining that the first number exceeds the second number comprises:
determining a difference between the first number and the second number; and
determining that the difference exceeds a threshold difference value.

7. The method of claim 5, wherein determining that the first number exceeds the second number comprises:
determining a ratio between the first number and the second number; and
determining that the ratio exceeds a threshold ratio value.

8. The method of claim 1, wherein the infrared image is a first infrared image captured by a first image sensor, wherein the difference of Gaussian image is a first difference of Gaussian image, wherein the one or more blob regions are one or more first blob regions, and wherein the method further comprises:
obtaining a second infrared image of the object, wherein the second infrared image is captured substantially simultaneously with the first infrared image by a second image sensor, and wherein the first infrared image and the second infrared image each represent the object from different perspectives;
determining a second difference of Gaussian image that represents features of the second infrared image that have spatial frequencies within the spatial frequency range;
identifying one or more second blob regions within the second difference of Gaussian image, wherein each blob region of the one or more second blob regions comprises a region of connected pixels in the second difference of Gaussian image; and
based on identifying the one or more first blob regions within the first difference of Gaussian image and the one or more second blob regions within the second difference of Gaussian image, determining that the first infrared image and the second infrared image each represent the object illuminated by the dot pattern projected onto the object by the one or more infrared projectors.

9. The method of claim 8, further comprising:
based on determining that the first infrared image and the second infrared image each represent the object illuminated by the dot pattern, determining a spatial correspondence between representations of physical features of the object in the first infrared image and the second infrared image; and
based on the spatial correspondence, determining a distance between one or more of the physical features of the object and one or more of the first image sensor or the second image sensor.

10. The method of claim 9, wherein determining the spatial correspondence comprises:
for at least one of the one or more first blob regions, determining a corresponding blob region of the one or more second blob regions that represents a dot projected onto a particular physical feature of the object by the one or more infrared projectors.

11. The method of claim 1, further comprising:
based on (i) determining that the infrared image represents the object illuminated by the dot pattern and (ii) positions of the one or more blob regions in the infrared image, determining a depth of one or more physical features of the object.

12. The method of claim 1, wherein identifying the one or more blob regions within the difference of Gaussian image comprises:
identifying, within the difference of Gaussian image, one or more regions of connected pixels that (i) contain between a first number of pixels and a second number of pixels and (ii) have a circularity greater than a circularity threshold.

13. The method of claim 1, wherein a first standard deviation of the first Gaussian operator defines a first spatial frequency threshold and a second standard deviation of the second Gaussian operator defines a second spatial frequency threshold, and wherein the spatial frequency range is defined by a range of spatial frequencies between the first spatial frequency threshold and the second spatial frequency threshold.

14. The method of claim 1, further comprising:
based on identifying the one or more blob regions within the difference of Gaussian image, determining at least one of (i) a number of the one or more blob regions or (ii) a density of the one or more blob regions; and
adjusting a power with which the one or more infrared projectors project the dot pattern onto the object based on at least one of (i) the number of the one or more blob regions falling below a threshold value or (ii) the density of the one or more blob regions falling below a threshold density.

15. The method of claim 1, wherein the one or more infrared projectors comprise a first infrared projector configured to project the dot pattern and a second infrared projector configured to project the flood pattern, wherein the infrared image is a first infrared image, wherein the difference of Gaussian image is a first difference of Gaussian image, wherein the one or more blob regions are one or more first blob regions, and wherein the method further comprises:
  obtaining a second infrared image of the object, wherein the second infrared image is captured before the first infrared image;
  determining a second difference of Gaussian image that represents features of the second infrared image that have spatial frequencies within the spatial frequency range;
  identifying one or more second blob regions within the second difference of Gaussian image, wherein each blob region of the one or more second blob regions comprises a region of connected pixels in the second difference of Gaussian image;
  based on identifying the one or more second blob regions within the second difference of Gaussian image, determining that the second infrared image represents the object illuminated by the flood pattern projected onto the object by the second infrared projector; and
  based on determining that the second infrared image represents the object illuminated by the flood pattern, obtaining the first infrared image.

16. The method of claim 1, wherein determining whether the infrared image represents the object illuminated by the dot pattern or the flood pattern comprises:
  determining that a number of the one or more blob regions is insufficient to determine whether the infrared image represents the object illuminated by the dot pattern or the flood pattern;
  based on determining that the number of the one or more blob regions is insufficient, providing the infrared image to an artificial neural network (ANN) configured to determine whether a particular infrared image represents the object illuminated by the dot pattern or the flood pattern; and
  receiving, from the ANN, determination of whether the infrared image represents the object illuminated by the dot pattern or the flood pattern.

17. A system comprising:
  one or more infrared projectors configured to project a dot pattern and a flood pattern;
  an infrared image sensor; and
  a processor configured to perform operations comprising:
    operating the one or more infrared projectors to project the dot pattern or the flood pattern onto an object;
    operating the infrared image sensor to capture an infrared image of the object;
    determining a difference of Gaussian image that represents features of the infrared image that have spatial frequencies within a spatial frequency range defined by a first Gaussian operator and a second Gaussian operator;
    identifying one or more blob regions within the difference of Gaussian image, wherein each blob region of the one or more blob regions comprises a region of connected pixels in the difference of Gaussian image; and
    based on identifying the one or more blob regions within the difference of Gaussian image, determining whether the infrared image represents the object illuminated by the dot pattern or the flood pattern projected onto the object by the one or more infrared projectors.

18. The system of claim 17, wherein the one or more infrared projectors comprise a first infrared projector and a second infrared projector, wherein the infrared image is a first infrared image, wherein the difference of Gaussian image is a first difference of Gaussian image, wherein the one or more blob regions are one or more first blob regions, and wherein the operations further comprises:
  operating the infrared image sensor to capture a second infrared image of the object;
  determining a second difference of Gaussian image that represents features of the second infrared image that have spatial frequencies within the spatial frequency range;
  identifying one or more second blob regions within the second difference of Gaussian image, wherein each blob region of the one or more second blob regions comprises a region of connected pixels in the second difference of Gaussian image; and
  based on identifying the one or more first blob regions within the first difference of Gaussian image and the one or more second blob regions within the second difference of Gaussian image, determining that (i) the first infrared image represents the object illuminated by the dot pattern projected onto the object by the first infrared projector and (ii) the second infrared image represents the object illuminated by the flood pattern projected onto the object by the second infrared projector.

19. A non-transitory computer-readable storage medium having stored thereon instructions that, when executed by a computing device, cause the computing device to perform operations comprising:
  obtaining an infrared image of an object;
  determining a difference of Gaussian image that represents features of the infrared image that have spatial frequencies within a spatial frequency range defined by a first Gaussian operator and a second Gaussian operator;
  identifying one or more blob regions within the difference of Gaussian image, wherein each blob region of the one or more blob regions comprises a region of connected pixels in the difference of Gaussian image; and
  based on identifying the one or more blob regions within the difference of Gaussian image, determining whether the infrared image represents the object illuminated by a dot pattern or a flood pattern projected onto the object by one or more infrared projectors.

* * * * *